United States Patent
Kotlicki et al.

(12)
(10) Patent No.: US 6,211,522 B1
(45) Date of Patent: Apr. 3, 2001

(54) PASSIVE INFRA-RED INTRUSION SENSOR

(75) Inventors: Yaacov Kotlicki, Ramat Gan; Nachum Tchernichovski, Ramat Hasharon; Mark Moldavsky, Petach Tikva; Boris Zhevelev, Rishon le Zion, all of (IL)

(73) Assignee: Visonic Ltd., Tel Aviv (IL)

( * ) Notice: Subject to any disclaimer, the term of this patent is extended or adjusted under 35 U.S.C. 154(b) by 0 days.

(21) Appl. No.: 09/109,495

(22) Filed: Jul. 2, 1998

(30) Foreign Application Priority Data

Jan. 4, 1998 (IL) .......................................... 122846

(51) Int. Cl.$^7$ ........................................ G01J 5/08
(52) U.S. Cl. ........................ 250/353; 250/DIG. 1
(58) Field of Search ................ 250/353, DIG. 1

(56) References Cited

U.S. PATENT DOCUMENTS

| | | |
|---|---|---|
| D. 331,124 | 11/1992 | Claytor . |
| D. 340,312 | 10/1993 | Claytor . |
| 4,058,726 | 11/1977 | Paschedag et al. . |
| 4,604,524 | 8/1986 | Kotlicki et al. . |
| 4,734,585 | 3/1988 | Owers . |
| 4,740,701 * | 4/1988 | Wuthrich et al. ..................... 250/342 |
| 4,787,722 | 11/1988 | Claytor . |
| 4,849,635 | 7/1989 | Sugimoto . |
| 4,868,391 * | 9/1989 | Messiou ............................... 250/353 |
| 5,572,033 * | 11/1996 | Grant ................................... 250/353 |
| 5,670,943 * | 9/1997 | DiPoala et al. ...................... 340/567 |

FOREIGN PATENT DOCUMENTS

| | | |
|---|---|---|
| 0 177 130 | 4/1986 | (EP) . |
| 1532518 | 11/1978 | (GB) . |
| 2 207 523 | 2/1989 | (GB) . |

OTHER PUBLICATIONS

Brochure "Passive Infrared: IR202", (1986) Arrowhead Enterprises Inc.

Brochures: MR–300 and FOX, Passive Infra–red Intrusion Sensors, Manufactured by Visonic Ltd., Tel Aviv, dated 1986 and 1987.

* cited by examiner

*Primary Examiner*—Constantine Hannaher
*Assistant Examiner*—Andrew Israel
(74) *Attorney, Agent, or Firm*—Darby & Darby

(57) ABSTRACT

An improved infra-red lens array for use in a passive infra-red intrusion sensor, which maintains high detection capability for intruders moving in the middle and near field, and yet discriminates well between the movement of intruders and of pets in the near field. The upper part of the lens array is composed of at least one row containing convex lenses, operative to focus the far and middle field radiation of the area to be protected onto the detector of the sensor. The lower part of the array has at least one row containing cylindrical lenses, with their axes of symmetry aligned vertically, operative to focus infra-red radiation from the middle and near fields onto the detector. Each cylindrical lens focuses a vertical curtain of the protected area onto the infra-red detector. In order to ensure reduced sensor sensitivity close to the floor of the protected area, so as to provide pet movement discrimination, the cylindrical lenses are provided with spatially selective attenuation, so as to reduce their transmission factor as a function of the angle between the sensor and points on the floor.

45 Claims, 12 Drawing Sheets

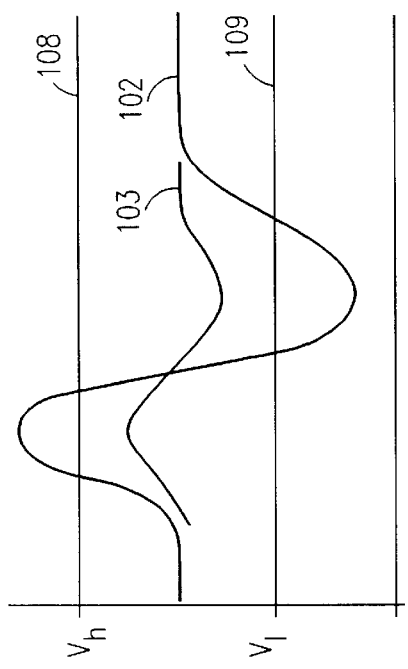
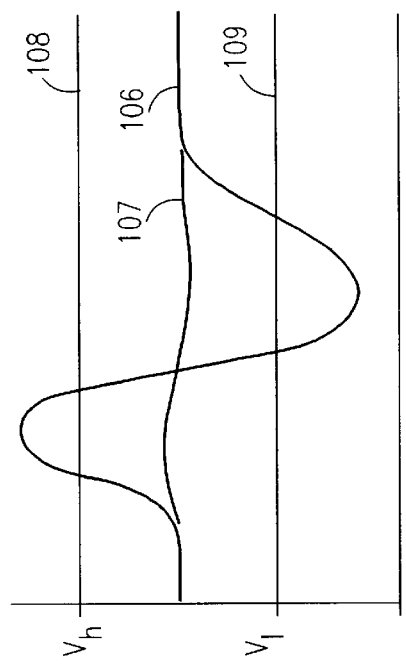
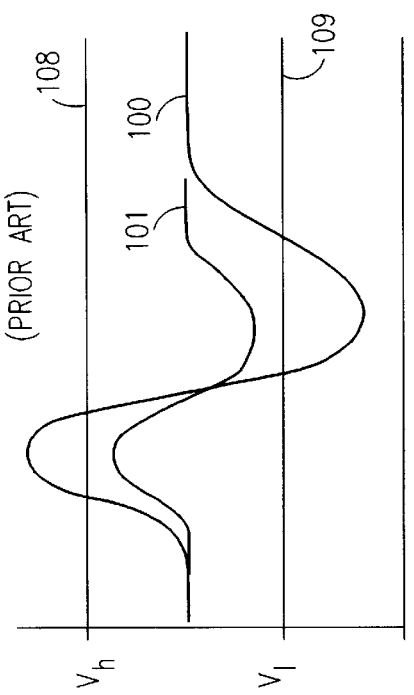
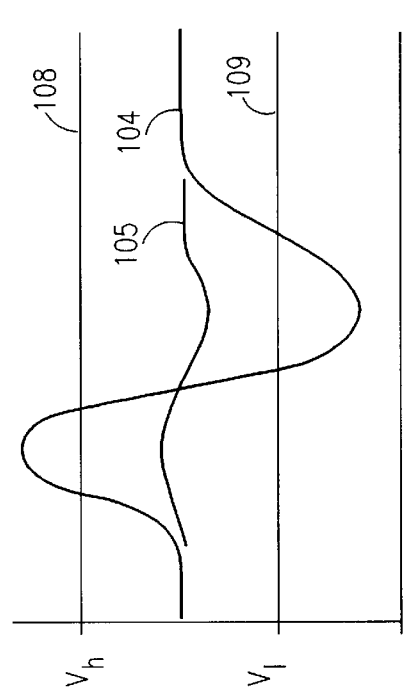

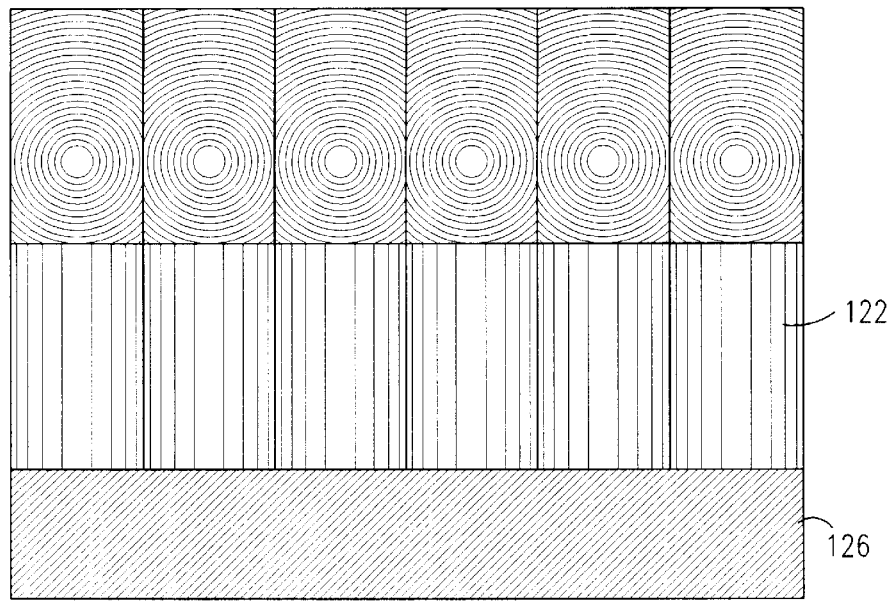
FIG. 13
FIG. 14A  FIG. 14B
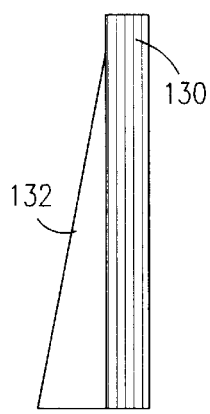 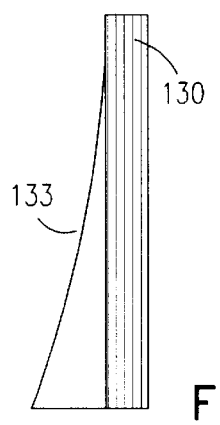
FIG. 15A  FIG. 15B
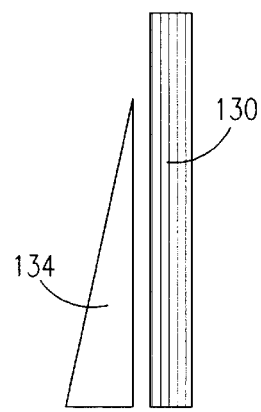 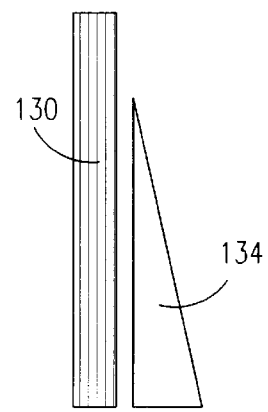

PASSIVE INFRA-RED INTRUSION SENSOR

FIELD OF THE INVENTION

The present invention relates to the field of passive infra-red intrusion sensors, and especially lens arrays for use in such intrusion sensors.

BACKGROUND OF THE INVENTION

Several types of passive infra-red sensors have been described in the prior art for detecting intruders in high security areas. Such sensors detect the changes in the infra-red radiation falling on an infra-red detector caused by movement of the infra-red emitting intruder in the field of view of the sensor. The area under intrusion surveillance is focused onto the infra-red sensitive detector by means of an array of lenses to produce a number of discrete zones. As the intruder crosses from zone to zone, the changes in the detector output above the ambient level from the surroundings are amplified by suitable circuitry, and an alarm signal generated.

In order to maintain uniform nomenclature in describing this invention, the term "sensor" is used as far as possible to describe the complete intrusion detection unit, and the term "detector" to describe the element within it which converts the infra red radiation to an electrical signal. Since these terms are used interchangeably in the prior art and the industry in general, this delineation is not always possible, especially in quotations, and the context should always be checked when there is any doubt as to the meaning.

The effectiveness of a passive infra-red intrusion sensor system as a function of the cost of manufacture, depends to a great extent on the effectiveness of the optical system in covering the whole of the area to be protected. Various schemes for providing as full cover as possible are described in the prior art. The major problem addressed is that of providing high detection sensitivity both for intruders moving at a distance from the sensor, and for those moving close to the sensor.

In addition, a related problem is that of discrimination between signals caused by real human intruders and those caused by pets such as dogs, cats, etc., moving close to floor level around the protected areas. This problem, known as pet immunity, is especially serious, since a proliferation of false alarms resulting from pets may cause the owners to switch off an otherwise effective alarm system, and in a situation where the presence of pets may be desirable, as they may add an additional element of protection.

In U.S. Pat. No. 4,058,726, assigned to Cerberus AG of Switzerland, the inventors describe a focusing system composed of a vertical array of cylindrical lenses with vertical axes. When correctly located in front of the detector, the array divides the surveillance area up into a number of vertical strip-shaped sectorial zones fanning out from the sensor. There are a number of limitations and disadvantages to a simple array of this type. Firstly, having only one sort of lens, the sensor is unable to effectively deal both with the far and the close fields of view. In particular, since cylindrical lenses magnify in one direction only, objects distant from the sensor do not fill the lens aperture well, and the far field sensitivity is therefore low. Only a convex focusing lens, usually, for this geometry in Fresnel form, is able to give good sensitivity at the far field, and practically all such systems currently produced use convex focusing lenses for the far field.

In addition, two further disadvantages of this system have been enumerated in U.S. Pat. No. 4,740,701, which too was assigned to Cerberus A. G. The authors state that such a simple cylindrical array is unable to provide good 90° vertical angular coverage when a "protective curtain" has to be provided in front of an opening such as a door or window. Furthermore, as it moves closer to the sensor, an object becomes poorly focused, both because of the non-optimal focusing distance, which has to be optimized for some median distance, and because of increased image aberrations as the object falls off-axis at angles below the sensor. Because of these two effects, to a large extent, almost all infra-red intruder detection systems suffer from reduced sensitivity in the lower fields of view which cover middle and near distances, and this is a problem which they have to solve in order to maintain good wide range coverage. At the same time, this property does have the positive effect of providing an inherent element of pet immunity for all such systems.

In the above mentioned U.S. Pat. No. 4,740,701, the inventors therefore describe a sensor which attempts to overcome these problems by using substantially cylindrical Fresnel lenses each having a longitudinal axis, a focal point and a focal length, the lenses being curved along an axis perpendicular to the longitudinal axis, to form a sector of a circle with radius equal to the focal length, and with the infra-red detector located at this focal center point. This prior art provides a well focused, narrow zone of surveillance area, which extends over a vertical angle of up to 90°. It also allows coverage of more than one direction, by using a separate Fresnel lens for each direction rather than an array of lenses. However, like the previously described Cerberus focusing system, the use of only one sort of lens prevents the sensor from being able to deal effectively both with the far and the close fields of view. Furthermore, the narrowness of the surveillance zones is in itself a serious drawback for covering a larger area, and it is thus limited to situations which require only one or two protective curtains.

In U.S. Pat. No. 4,604,524, Y. and M. Kotlicki describe a sensor which overcomes some of these drawbacks, especially in the far field areas, by means of an array composed of multi-faceted convex focusing lenses of differing configurations, each configuration corresponding to differing protection zones. The arrays are spatially arranged to define several protection zones at various angles to the horizontal. The lens array is curved around a vertical axis, such that the sensor is able to cover an azimuthal angle of up to 140°. The vertical angle covered is from 25° above the horizontal, to 10° below the horizontal. However, as is apparent from the ray coverage scheme shown in FIG. 6B of this patent, this system, too, is primarily effective for wide area coverage, and is limited in its ability to detect intruders in areas closer to the sensor. As the intruder approaches the sensor, the emitted radiation coming from the lower zone becomes more and more off-axis with respect to the normal to the sensor, and the sensitivity of the system to such radiation falls off considerably.

In U.S. Pat. No. 4,734,585 assigned to Racal Guardall, one of the leaders in the field of intruder detection, the inventor I. Owers points out that a further cause of reduced sensitivity close to the sensor, and therefore in the lower zone since the sensor is mounted high on a wall, is that the signals generated by objects moving in these areas are of high frequency, to which the detector is less sensitive. His invention attempts to fulfill the requirement of increasing sensitivity close to and at angles below the sensor by means of a composite lens array which includes some slotted sections. This array has an upper section composed of Fresnel lenses (which from their described function must be convex lenses), providing multi-zone long range coverage at the horizontal level, and two lower sections of Fresnel (convex) lenses, each curved at an increasing angle below the horizontal, to provide medium and short range coverage. The latter two sections include vertical slots between the lens segments, through which the infra-red radiation passes without any focusing action. These slots define zones with large fields of view, determined solely by the dimensions of the slots and their location with respect to the infra-red detector.

This slot technology has a number of disadvantages. The inventor himself states that because of the lack of any focusing effect, the sensor has a large field of view, which the image of an intruder may not fill. The detection sensitivity is therefore low. However, the inventor claims that for detection in the near field, the proximity of the intruder to the sensor increases the amount of radiation received, and thus should compensate for the lack of any focusing effect of the slots. This limits the effectiveness of such slots to the near field, and a maximum detection distance of 4 meters is quoted in this patent.

Furthermore, the only effective and currently used signal detection technique for passive intrusion sensor systems is with a dual element detector with differential signal analysis. However, for an array of slots, it is essential that the location of the slot array be significantly closer than the focal length of a typical optical element, such as a lens, in order to achieve zone separation. If the zones overlap too much, they cancel each other out. If such slots are integrated together with Fresnel lenses, such as described in FIG. 4 of this patent, the use of a double detector will cause excessive overlap, and a single element detector is required. This has been long recognized by the industry as being less effective and reliable than double element detection.

Finally, in order to achieve sufficient sensitivity in the absence of any focusing effects with the slot configuration, the slots have to be located very close to the detector surface, 9.5 mm in the basic embodiment described in the patent. Though the inventor claims that this makes for a compact sensor, it also complicates the construction, because the focal length of the lenses used are typically between 25 and 35 mm, therefore conflicting with the slot distance requirement.

The inventor also states that the infra-red radiation suffers lower loss as it passes through the plain strips or slots, compared to the losses suffered in passage through the Fresnel lens segments. From this it is apparent that the use of convex Fresnel lenses for the near field should be avoided because of the transmission losses they cause at the angles of incidence used for the near field.

A. Y. Messiou in U.S. Pat. No. 4,868,391, assigned to the U.S. Philips Corporation, describes a composite lens array composed of two orthogonal flat sheet assemblies of individual convex Fresnel lenses, one horizontally and one vertically disposed in front of the infra-red detector. The vertical sheet provides long range surveillance over the area to be protected, while the horizontal sheet located at its lower edge, covers the near field and the area below the sensor. This inventor too states that the use of Fresnel lenses at high angles of incidence leads to large off-axis losses, this being a characteristic of such lenses. In FIG. 4 of this patent, the inventor shows the strong fall-off in sensitivity for Fresnel lenses operating at large angles of incidence, with the radiation falling to half at 17 degrees off-axis, and to only 10% at twice this angle.

Therefore, Messiou, like Owers, also suggests that in order to increase sensitivity in the near field, for radiation coming from the lower zones where the angle of incidence is high, the convex Fresnel lenses may be replaced by clear slots, which in this embodiment, alternate with opaque strips. These clear slots are located along the front edge of the horizontal lower sheet, and the bottom edge of the vertical sheet. The radiation from a close intruder passes unfocussed through the slots to the detector. Such slots are effective for detecting motion of an intruder transverse to the direction of the length of the slots. These slots suffer though, from the same problems mentioned above regarding the Owers technology.

Messiou also proposes the use of pairs of orthogonally aligned cylindrical lenses, each lens of the pair being aligned at an opposing angle of 45° to the edges of the sheets. Since each cylindrical lens focuses radiation in one direction only, such a pair of orthogonally aligned lenses effectively eliminates any preferred direction of motion along which an intruder could move without causing a change in the radiation incident on the detector. The orthogonal cylindrical lens pairs, with their defined ±45° alignment relative to the direction of the field of view of the detector element, are specifically prescribed for directional motion discrimination, in order to detect intruders moving straight towards the sensor. With a spherical lens, such motion would cause virtually no change to the signal from the detector.

In U.S. Pat. No. 5,670,943, W. S. DiPoala et al. describe an intruder sensor designed with particular emphasis on solving the problem of pet immunity. Their invention, like most of the prior art mentioned hereinabove, and like the majority of systems currently available, divides the area to be protected into upper and lower zones, which are equivalent respectively to the far, and middle or near fields of the previously mentioned prior arts. The lower zone is that which intersects the floor plane within the protected area, and pets are generally only to be found in this lower zone. Each zone is imaged onto the detector elements by means of its own multi-faceted optics array. Pet immunity is achieved in this invention by lowering sensitivity in the lower zones and controlling temperature discrimination detection levels, such that pets do not trigger an alarm.

However, even though this is not always mentioned, the inventions described in almost all of the prior art previously mentioned also incorporate an intrinsic level of pet immunity, since, because of several opto-geometric effects, the lower zones generally have lower sensitivity than the upper zones. These effects include sensitivity reductions due to off-axis phenomena and due to the larger f-numbers needed for the focusing optics for the lower zones. Such effects are, for instance, shown explicitly in the Owers and Messiou inventions.

FIG. 6 of Owers' patent illustrates the decrease in sensitivity of a sensor, in moving from the far field to the medium field to the near field segments of its Fresnel lens array. Owers even states, inter alia, that "a sensor using focusing optical arrangements tends to have very poor sensitivity close to the sensor but good longer range characteristics". Owers also points out, as mentioned above, that there is also a reduction in sensitivity close to the sensor because of the poor high frequency response of the detector.

FIG. 4 of Messiou's patent illustrates the reduction in the radiation received at a detector due to three geometric off-axis effects of a planar lens array, namely the cosθ geometric effect, increased reflection from the lens array surfaces, and lens aberration and out-of-focus effects. These off-axis effects are equivalent to those arising from the location of the emitting objects in the lower zone.

In the Kotlicki's invention also, though the effect of reduced sensitivity in the lower zone is not mentioned explicitly, it is evident from FIG. 3A of their patent. The aperture of the lower zone lenses 70 is smaller than that of the upper zone lenses 60, and hence the f-number of lenses 70 larger than that of lenses 60, resulting in reduced sensitivity in the lower zone. The resulting reduced sensitivity is apparent in FIG. 6B, from the reduced range of detection for radiation from the lower zone, labeled f, as compared with that from the upper zone, labeled m.

Based on this invention, in the early Model MR-3000 and Fox passive infra-red intrusion sensors, manufactured by Visonic Limited of Tel Aviv, Israel, seven small convex lens segments were used in the lowest row of the lens array for imaging the near field. This can be observed in the instruction manuals and data sheets dated 1986 and 1987 respectively for these models. In later versions, when it became apparent that the reduced intrusion detection probability resulting from the lower near field sensitivity, was more problematic than the element of pet immunity provided by this lower sensitivity, three larger lenses, each with smaller f-number, were used in the lower row. This is shown clearly in the instruction manuals sent with these models from the end of the eighties. This provided a better near field detection capability, at the expense of pet avoidance.

In order to improve pet avoidance, these Visonic sensors incorporate a method, described for instance on page 28 of the 1987 issue of the MR-3000 instruction manual, and pages 4 and 5 of the 1990 Fox installation instructions, whereby a mask of one or two layers of infra-red attenuating material is positioned over the bottom two rows of lenses, thus reducing the transmission efficiency of the lower zone optics, and so reducing false alarm signals from pets roaming in the lower zones.

Arrowhead Enterprises Incorporated of New Milford, Conn., use a method called uniform imaging to provide pet immunity. This is described in the specification sheet for the Model IR202 passive infra-red sensor, manufactured by them for a number of years. This is effectively a method whereby the field of view is adapted to the distance from the sensor. This sensor, like most of the contemporary art, uses a faceted optics lens array for imaging a number of separate zones of the protected area. For the closer zones, where a pet or even a rat or mouse would fill much of the field of view, leading to false alarms, lenses with a different f-number are used, in order to reduce the signal produced by objects in the closer zones, thus providing pet immunity.

In U.S. Pat. No. 5,670,943, DiPoala et al., presumably without being aware of all of the above mentioned prior art, describe the use of optics in the lower zone, which are less efficient at transmitting infra-red energy than the upper zone optics. In the detailed description of the invention, a preferred embodiment shows lower zone lenses with reduced sensitivity by virtue of their smaller aperture or larger f-number, as taught in much of the above mentioned prior art. They further state that pet discrimination by reduced lower zone sensitivity can also be attained by means of defocused optics or by optical filters (as taught in the Visonic prior art), both of which are equivalent, in their words, to reduced "effective" optical aperture or greater "effective" f-number. They also propose reduced electronic amplifier sensitivity as a method to provide pet immunity.

The DiPoala invention suffers from a number of serious disadvantages. In the first place, the reduction in sensitivity is applied over the whole of the lower zone, the zone being defined by the infra-red optics or by other means used to focus or direct the radiation from it onto the sensor. The inventors state in column 5, lines 16–23, that as a result of the sensitivity reduction in the lower zone, "since household pets such as cats and dogs will not normally be present in the upper more sensitive zones, the 'catch' performance of the detector is enhanced without sacrificing pet immunity". It is not clear how the 'catch' performance of a system is enhanced by reducing sensitivity in the lower zone. Most of the inventions described in the recent prior art quoted, in order to fulfill the primary function of detecting intruders, strive to provide improved sensitivity in the lower zones, where the sensitivity tends to fall off of its own accord. The DiPoala invention, in order to provide pet immunity, takes a backward step to the earlier techniques which have poorer lower zone sensitivity. This approach thus foregoes the advantages of improved lower zone detection, as demanded by the latest requirements of the industry. The DiPoala mechanism could perhaps be better described as lower zone desensitization, and it may seriously affect the probability of intruder detection in the near and mid-field zones. The efficacy of this approach would thus seem to be dubious.

Furthermore, the size of the field of view in the lower zone per optical element is given as about 0.5 ft wide by 0.75 ft high, which means that a typical pet completely fills the field of view. Therefore, in order to discriminate between a human intruder, who too fills the whole field of view, and a pet in the lower zone, the invention relies on differentiating between the difference in temperature of these two subjects with respect to the background temperature. The inventors state that dogs have a temperature differential of from 2 to 6° F. above a normal room temperature background of 70° F., depending on the length of their hair, while a human is from 8 to 13° F. above the background, depending too on his/her clothing. These emission temperature differences are very close, and are obviously also strongly dependent on environmental conditions and on which part of the intruder's body is imaged by the sensor, besides the dependence on pet hair length and intruder clothing. The particular circumstances present in each intrusion event could easily introduce errors considerably higher than the quoted minimum 2° F. difference between typical human and pet emission temperature differences. The graphs shown in FIGS. 4 and 6 of the DiPoala patent, which show the human signal in the lower zone to be a factor of about 2.3 larger than the pet signal, would thus seem to show an optimum situation. In practice, the difference would generally be smaller or even reversed, as explained above.

It is therefore likely that intruder sensors based on this invention suffer either from false alarms if the alarm threshold is set too low, or from missed intrusions if the threshold is set too high. Indeed, it is possible that because of the difficulty of achieving the fine temperature discrimination required, the inventors found the need to decrease the likelihood of detecting pets by artificially reducing the detection sensitivity of the lower zones, thereby also reducing the detection probability for a human in the lower zone.

Since the detection reliability of the DiPoala invention is dependent on the difference between the intruder emission temperature and the background temperature, a reference measurement of the background temperature is required in order to increase the sensitivity of the detection system as the background temperature approaches the temperature of the human body. This is performed by a thermistor mounted in the sensor head next to the detector. However, since this location does not necessarily provide an accurate indication of the true background temperature in the immediate vicinity of the intruder, and because of the difference in the pet and human body temperatures, this is a further potential cause for false alarms or missed intrusions.

The field of view used in any intrusion sensor has a major effect on the ease with which the system detects small objects such as pets. Owers, in the above-mentioned U.S. Pat. No. 4,734,585, pointed out that if the field of view is too small, even a rat or mouse may fill it and cause false alarms. This too is the approach adopted in the Arrowhead Enterprises' "uniform imaging" technology mentioned above. Therefore, DiPoala's stated use of a small field of view would appear to acerbate the problem of pet immunity, rather than to assist in solving it.

In none of the prior art mentioned has an adequate solution been provided for the problem of the detection of intruders in all of the protected area fields, far, middle and near. Both the Messiou and Owers prior arts mentioned, which use lens arrays with transparent slots to cover the middle and near areas, suffer from poor sensitivity both because the slots lack specific focusing means, and because they may require use of a single element detector because of zone overlap. Furthermore, the problem of providing efficient pet discrimination has also not been satisfactorily solved, especially in those examples of the prior art where the lower zone sensitivity is maintained at a value high enough to detect intruders in the near field. The DiPoala invention and the masked implementations of the Visonic MR-3000 and Fox sensors, while claiming good pet immunity performance, would appear to suffer from a lack of sensitivity in the whole of the lower zone. The DiPoala invention probably also has a signal level discrimination problem, likely to result in either an excess of false alarms, or in missed intruders.

The disclosures of all publications mentioned in this section and in the other sections of the specification, and the disclosures of all documents cited in the above publications, are hereby incorporated by reference.

SUMMARY OF THE INVENTION

The present invention seeks to provide an improved passive infra-red intrusion sensor, which overcomes the disadvantages and drawbacks of existing sensors, especially with respect to the detection of intruders in the middle and near field, and with respect to the discrimination between the movements of intruders and pets.

There is thus provided in accordance with a preferred embodiment of the present invention, a passive infra-red sensor with a thin multi-faceted lens array for mounting on the front surface of the housing, an infra-red detector being located within the housing in a suitable position, the lens array being operative to focus onto the detector infra-red radiation emanating from the area to be protected by the sensor. The multi-faceted lens array is configured of several rows of different lens types, each type selected to focus onto the detector different zones of the area to be protected.

The upper part of the multi-faceted lens array is composed of at least one row containing convex lenses, which could be implemented as Fresnel lenses, operative to focus the far and part of the middle field radiation of the area to be protected onto the detector.

Additionally, the lower part of the multi-faceted lens array is composed of at least one row containing lenses having substantially cylindrical symmetry, with their axis of symmetry aligned vertically, operative to focus the middle and near fields of emitted infra-red radiation onto the detector of the sensor. Since such lenses, if purely cylindrical, have focusing power only in the azimuthal plane, and no focusing power in the vertical plane, each lens focuses a vertical curtain of the protected area onto the infra-red detector. An array of these lenses, each aligned at a slightly different azimuthal angle, provides a span of azimuthal coverage of the middle and near field.

If these lenses are not purely cylindrical, but have cylindrical symmetry, such as lenses of a conico-frustum form, or aspheric lenses with a cylindrical domination, then it is the cylindrical component of the lenses which is operative in performing the described focusing effects of the infra-red radiation emitted from the middle and near fields, and in providing the other functions ascribed to the use of cylindrical lenses, as described hereinunder.

In accordance with a further preferred embodiment of the present invention, the upper at least one row of convex Fresnel lenses of the multi-faceted lens array may be curved outwards in a radius from the front surface of the sensor housing, with the detector located close to the center of curvature of the array, such that the horizontal azimuthal coverage of the focusing effect of the lens array is increased in comparison with a flat array of similar properties. In a similar manner, the at least one row of the lens array containing cylindrical lenses may be curved downwards in a radius from the bottom surface, or from the bottom front edge of the sensor housing, such that the downward looking azimuthal coverage of the lens array is increased in comparison with a flat array of similar properties.

In order to ensure reduced sensitivity of the sensor for near field detection close to the floor of the protected area, so as to provide pet movement discrimination, there is provided, according to a further preferred embodiment of the present invention, masking on the cylindrical lenses, in such a way as to reduce their transmission factor in a predetermined manner as a function of the angle between the sensor and points on the floor at various distances from the sensor wall. The transmitted intensity reduction is achieved either by selective masking on each individual cylindrical lens segment, such that the transmission coefficient of each lens segment is reduced to a minimum at the bottom edge of the lens array, or by selective masking of the complete row of cylindrical lenses, such that the overall transmission of the array is reduced to a minimum at its bottom edge, in accordance with the mask's spatial profile.

As an alternative to masking the cylindrical lens array, and in accordance with yet another preferred embodiment of the present invention, the spatial transmission factor of the cylindrical lenses can be reduced by means of an attenuating thickness wedge in their profile, or by means of an attenuating wedge applied elsewhere in the optical beam path between the cylindrical lenses and the infra-red detector.

As a further means of providing a graded sensitivity profile for the radiation coming from the lower zone of the field of view, there is further provided in accordance with yet another preferred embodiment of the present invention, a method whereby part of the beam is reflected off the surface of a transmitting material, the extent of such reflection being a function of the angle of incidence of the beam on the transmitting material surface. The reflecting surface can be either a flat or curved sheet of optical material, or even the surface of the detector window itself.

There is further provided in accordance with yet another preferred embodiment of the present invention, an infra-red lens array including a plurality of lenses, at least one of which may be a Fresnel lens, the lenses being arranged in at least one upper row including at least one convex lens, and at least one lower row including at least one cylindrical lens whose cylindrical axis is aligned substantially perpendicular to the direction of the row.

In accordance with still another preferred embodiment of the present invention, there is provided a passive infra-red intrusion sensor, consisting of a housing, an infra-red detector, and an infra-red lens array as described above.

In accordance with yet another preferred embodiment of the present invention, the at least one upper row of the above mentioned infra-red lens array may consist of two upper rows.

In accordance with a further preferred embodiment of the present invention, the at least one lower row containing at least one cylindrical lens of the above mentioned infra-red lens array, may also contain at least one convex lens.

There is further provided in accordance with yet another preferred embodiment of the present invention, a passive infra-red intrusion sensor as described above, and wherein the at least one upper row consisting of at least one convex lens of the infra-red lens array has azimuthal outward curvature There is provided in accordance with still a further preferred embodiment of the present invention, a passive infra-red intrusion sensor as described above and wherein the at least one lower row consisting of at least one cylindrical lens of the infra-red lens array has azimuthal outward and downward curvature.

In accordance with a further preferred embodiment of the present invention, there is further provided a passive infra-red intrusion sensor as described above, and wherein the at least one upper row consisting of at least one convex lens of the infra-red lens array is operative to image a more distant section of an area under surveillance than the section imaged by the at least one lower row consisting of at least one cylindrical lens.

In accordance with still another preferred embodiment of the present invention, there is provided a passive infra-red intrusion sensor as described above, and wherein the at least one lower row consisting of at least one cylindrical lens of the infra-red lens array is operative to image at least one vertically shaped sector of an area imaged by the lens.

There is further provided in accordance with still another preferred embodiment of the present invention, a passive infra-red intrusion sensor as described above, and wherein the vertical field of view of the at least one cylindrical lens of the infra-red lens array is such that it is essentially just filled by an average sized adult in a standing disposition, located near the center of the area imaged by the lens.

In accordance with still another preferred embodiment of the present invention, there is provided an infra-red lens array consisting of at least one row consisting of at least one cylindrical lens operative to provide spatially selective attenuation to radiation imaged by the lens.

In accordance with still another preferred embodiment of the present invention, there is provided a passive infra-red intrusion sensor whose infra-red lens array consists of at least one row consisting of at least one cylindrical lens operative to provide spatially selective attenuation to radiation imaged by the lens.

There are further provided in accordance with further preferred embodiments of the present invention, an infra-red lens array as described above, and wherein the spatially selective attenuation is produced by means of masking which may be applied either to individual cylindrical lenses in the at least one row consisting of at least one cylindrical lens, or across the whole of the at least one row consisting of at least one cylindrical lens.

In accordance with still another preferred embodiment of the present invention, there is provided a passive infra-red intrusion sensor as previously described, and in which the spatially selective attenuation of the infra-red lens array is operative to cause variation of the imaging sensitivity of the at least one cylindrical lens as a function of the angle from the array towards points on the floor of the area being imaged by the at least one cylindrical lens.

Furthermore, in accordance with yet another preferred embodiment of the present invention, there is provided a passive infra-red intrusion sensor as previously described, and in which the variation of the imaging sensitivity of the at least one cylindrical lens of the infra-red lens array, as a function of the angle from the array towards points on the floor of the area imaged by the at least one cylindrical lens, varies as a function of the azimuthal field of view of the array.

There is even further provided in accordance with a preferred embodiment of the present invention, a passive infra-red intrusion sensor as described above, and wherein the spatially selective attenuation of the infra-red lens array is operative to reduce the probability of detection of objects such as pets located below a predefined angle from the horizontal.

In accordance with yet another preferred embodiment of the present invention, there is provided a passive infra-red intrusion sensor, consisting of a housing, an infra-red detector, a lens array consisting of at least one row consisting of at least one cylindrical lens for imaging infra-red radiation onto the detector, and optical apparatus causing spatially selective attenuation to radiation imaged by the at least one cylindrical lens.

Furthermore, in accordance with yet another preferred embodiment of the present invention, the lens array of the passive infra-red intrusion sensor described above may also contain at least one upper row consisting of at least one convex lens.

There are also provided in accordance with further preferred embodiments of the present invention, passive infra-red intrusion sensors as described above, and wherein the spatially selective attenuation is produced by means of masking which may be applied to individual cylindrical lenses in the at least one row consisting of at least one cylindrical lens.

In accordance with yet more preferred embodiments of the present invention, there are provided passive infra-red intrusion sensors as described above, and wherein the spatially selective attenuation is produced either by means of an infra-red attenuator disposed in the optical path of the radiation, or by means of reflection of the radiation from a surface in the optical path of the radiation, or by the use of at least one cylindrical lens made of infra-red attenuating material and having an optical thickness of tapered profile, or by means of a tapered section of infra-red attenuating material, disposed in juxtaposition to the at least one cylindrical lens.

There are furthermore provided in accordance with preferred embodiments of the present invention, passive infra-red intrusion sensors as described above, and wherein the infra-red attenuator is a tapered section or a sheet of attenuating material interposed between the at least one cylindrical lens and the infra-red detector.

In accordance with even more preferred embodiments of the present invention, there are provided passive infra-red intrusion sensors as described above, and wherein the reflection of the radiation takes place either from the surface of a sheet of infra-red transmitting material interposed between the at least one cylindrical lens and the infra-red detector, or from the surface of the infra-red detector.

There is provided in accordance with another preferred embodiment of the present invention, a passive infra-red intrusion sensor as described above, and wherein the spatially selective attenuation is operative to cause variation of the imaging sensitivity of the at least one cylindrical lens as a function of the angle from the sensor towards points on the floor of the area being imaged by the at least one cylindrical lens.

There is provided in accordance with a still further preferred embodiment of the present invention, a passive infra-red intrusion sensor as described above, and in which the variation of the imaging sensitivity of the at least one cylindrical lens as a function of the angle from the sensor towards points on the floor of the area being imaged by the at least one cylindrical lens, varies as a function of the azimuthal field of view of the array.

In accordance with yet another preferred embodiment of the present invention, there is provided a passive infra-red intrusion sensor as described above, and wherein the spatially selective attenuation is operative to reduce the probability of detection of objects such as pets located below a predefined angle from the horizontal.

There is provided in accordance with a still further preferred embodiment of the present invention, a passive infra-red intrusion sensor consisting of optical apparatus causing spatially selective attenuation to radiation emitted from an object being sensed, the spatially selective attenuation being operative to reduce detection sensitivity close to floor level where a human emits lower levels of radiation, and to maintain detection sensitivity at human head and hand level, where a human emits higher levels of radiation, thereby providing a lower probability of detecting a pet and a higher probability of detecting a human.

There is further provided in accordance with more preferred embodiments of the present invention, an intrusion sensor system consisting of a passive infra-red intrusion sensor as described above, and at least one additional intrusion sensor, surveilling the same area. This additional sensor could be an active microwave sensor, or an active ultrasonic sensor or another passive infra-red intrusion sensor, or any other suitable sensor.

BRIEF DESCRIPTION OF THE DRAWINGS

The present invention will be understood and appreciated more fully from the following detailed description, taken in conjunction with the drawings, in which:

FIG. 5A is a front view of the sensor, while FIG. 5B is a side view. FIG. 5C shows how the complete lens array is provided with azimuthal curvature to the top convex Fresnel lens rows, and azimuthal and downward curvature to the bottom cylindrical lens row.

FIG. 9A is a view of the coverage obtained when an array such as that shown in FIG. 4 is used, while

FIGS. 10A to 10D show the electronic signals produced by the pyroelectric infra-red detectors used in the systems shown in FIGS. 9A and 9B, for human intruders and pets under various conditions.

FIG. 10A shows the signals obtained with a prior art sensor from a human moving in the middle of the near field of the area shown in FIG. 9B, and from a pet moving in the same area.

FIG. 10B illustrates signals obtained because of field of view effects using a sensor constructed and operative according to the present invention, from a human moving in the middle of the lower zone of the area shown in FIG. 9A, and from a pet similar to that of FIG. 10A moving in the same area.

FIG. 10C illustrates how the signals shown in FIG. 10B are affected by also taking emission temperature effects into account.

FIG. 10D illustrate how the signals shown in FIG. 10C, are affected when spatially selective attenuation is applied to the cylindrical lens rows.

FIGS. 11 to 13 show different methods of controlling the attenuation of the cylindrical lenses to obtain the pet avoidance mechanism.

In FIG. 11, each lens segment is masked individually by a suitably shaped mask, to provide gradually increased attenuation with increased angle towards the floor.

In FIG. 12, a suitably shaped mask is placed over the whole of the cylindrical lens array to vary the pet avoidance effect with position in the protected area.

FIG. 13 shows a masking method whereby the sensor sensitivity is reduced to zero below a defined angle above the floor.

FIGS. 14A to 18 illustrate different methods of providing spatially varying beam attenuation, in order to implement pet avoidance using sensors constructed and operative according to the present invention.

FIG. 14A shows a cylindrical lens, tapering in thickness towards its bottom edge.

FIG. 14B shows a similar lens, but wherein the tapered cross section of the lens is curved.

FIG. 15A shows a tapered section of infra-red absorbing material disposed at the back side of a cylindrical lens, while FIG. 15B shows such a tapered section at the front side.

FIG. 18 shows the infra-red detector tilted at an angle in such a way as to cause spatially varying reflection of the beam from its surface.

DETAILED DESCRIPTIONS OF PREFERRED EMBODIMENTS

Figure 1:
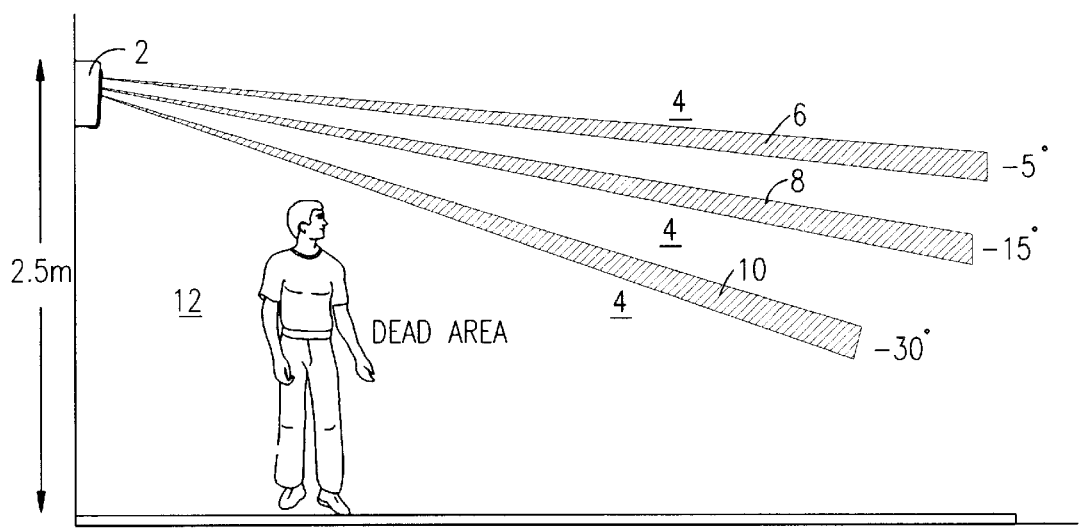
FIG. 1 is a schematic view of an area protected by means of a passive infra-red intrusion sensor using a prior art infra-red lens array for focusing the room radiation. It is clear that the prior art lens array is not capable of effectively focusing radiation close to the sensor, such that an unprotected dead area is formed within the area under surveillance.

Reference is now made to FIG. 1 which is a schematic view of an area protected by means of a widely used passive infra-red intrusion sensor using a typical prior art infra-red lens array for focusing the room radiation, such as the multi-faceted lens array used in the sensor described in U.S. Pat. No. 4,604,524. The sensor 2 is mounted at a height of about 2.5 m above floor level, and faces the area to be protected 4. The beams 6, 8, 10, are a schematic representation of the areas covered by the separate rows of convex focusing elements of the prior art lens array, and coverage is shown for areas extending at angles down to 30° below the horizontal. It is apparent from this drawing that this prior art lens array is not capable of effectively focusing radiation close to the sensor, such that an unprotected dead area 12 is formed within the area under surveillance, close to the sensor.

Figure 2:
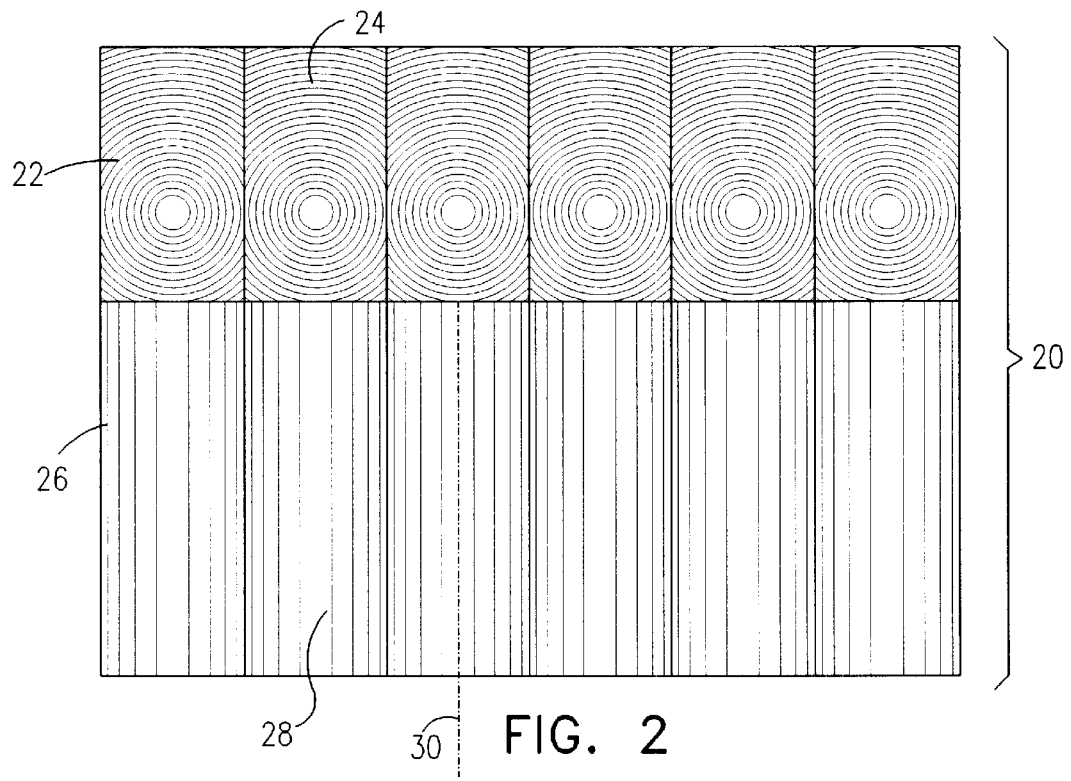
FIG. 2 shows a multi-faceted lens array for use in a passive infra-red intrusion sensor according to the present invention, which includes one row of convex Fresnel lenses at the top for far field focusing, and one row of substantially cylindrical lenses at its lower end for mid/near field focusing.

Reference is now made to FIG. 2, which shows a thin multi-faceted infra-red sensor lens array 20 suitable for mounting on the front surface of a passive infra-red intrusion sensor, constructed and operative according to a preferred embodiment of the present invention. An infra-red detector is located within the housing in a suitable position behind the lens array, and the lens array is operative to focus onto the detector infra-red radiation emanating from the area to be protected by the sensor. The construction of a typical sensor unit utilizing a lens array according to the present invention, is described below in FIGS. 5A and 5B, following the description of the lens array itself.

The lens array comprises a row 22 of convex Fresnel lenses 24 in its upper section for focusing middle and far field radiation from the area to be protected, onto the detector in the sensor housing. The use of the description convex in this specification is meant to include any positive focusing lens, such as a positive meniscus, plano-convex, aspheric, or other such lens. The focal length of these lenses are chosen to be a compromise value for mid/far distance focusing, and good coverage out to 10 meters is typically obtained.

At its lower end, the array comprises one row 26 of cylindrical lenses 28 with axes 30 aligned vertically, operative to focus the near field of emitted infra-red radiation onto the detector of the sensor. Since cylindrical lenses, if purely cylindrical, have focusing properties only in the azimuthal plane perpendicular to their axis, the result is that each lens focuses a vertical curtain of the protected area onto the infra-red detector. Such cylindrical lenses provide good detection for distances of from about 1 meter out to over 6 meters.

The use of the term cylindrical in connection with this invention is meant also to include any lens having generally cylindrical symmetry, such as lenses of a conico-frustum form, or aspheric lenses with a cylindrical domination. It is then the cylindrical component of the lenses which is operative in performing the described focussing effects of the infra-red radiation emitted from the middle and near fields, and in providing the other functions ascribed to the use of cylindrical lenses, as described herein.

Because of the vertical curtain shape of the coverage provided by such cylindrical lenses, a sensor constructed and operative according to the present invention, is far less sensitive to the angle of alignment than prior art sensors which use convex lenses for the near fields. In order to ensure that the various coverage "beams" of prior art sensors are correctly aligned, an angular scale is often provided within or on the sensor head, to assist the technician in aligning the head. Such a scale is shown, for instance, in FIG. 2A of U.S. Pat. No. 4,604,524. Even using such an aid, prior art sensor alignment is a job for a skilled installation technician, who adjusts the alignment according to the requirements of the area to be protected. By virtue of the high coverage provided by cylindrical lenses, sensor systems constructed according to the present invention are capable of being installed by a layman with a minimum knowledge of do-it-yourself techniques, and even then, in much less time than it would take a technician to install a prior art sensor. The installation of such intruder sensors could even become part of an overall utilities installation program, as is the trend today for other home installed services.

The slots used in the prior art lens arrays mentioned in the Background section for near field imaging, have no positive focusing power. In addition, the use of slots with dual element detectors is problematic. The cylindrical lenses of the present invention, on the other hand, are optical elements with positive focusing power, and can be readily used with such detectors. Consequently, a lens array constructed and operated in accordance with this preferred embodiment of the present invention has considerable advantages over prior art arrays which use slots, both in the extent of the coverage provided in the mid/near field, and in the sensitivity of detection provided within that area.

Furthermore, cylindrical lenses, even if implemented in Fresnel form, though not as transparent to infra-red radiation as slots constructed of plane sheets of plastic material, cause less optical attenuation at vertical off axis angles than convex Fresnel lenses. They therefore also have an advantage in this respect over other prior art arrays which use convex Fresnel lenses for focusing the near field.

Figure 3:
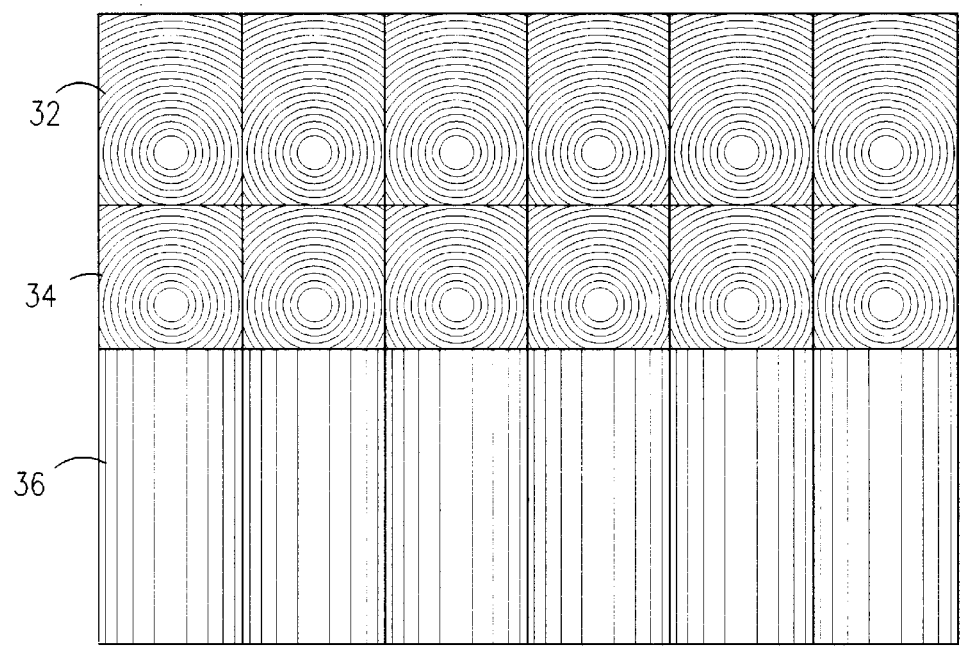
FIG. 3 shows an array similar to that in FIG. 2 except that two rows of convex Fresnel lenses are provided at the top, so that middle and far distances of the protected area can be separately and optimally focused onto the infra-red detector.

FIG. 3 shows a further preferred embodiment of a lens array for use in a passive infra-red intruder sensor, this array being similar to that in FIG. 2 except that the top section comprises two rows 32, 34, of convex Fresnel lenses. The top row 32 is operative to image the furthest parts of the area under protection, typically out to 15 m. The next row 34 images the middle field area, typically out to 10 m. The advantage of using two rows of convex Fresnel lenses is that any dead zone in the mid-field is reduced, and this increases the effective range of the sensor. The decision as to whether to use a single row of convex lenses as in FIG. 2, or a double row as described in FIG. 3 is therefore dependent on the extent of the area to be protected by the sensor. The bottom row 36 of the array comprises cylindrical lenses, as previously described.

Figure 4:
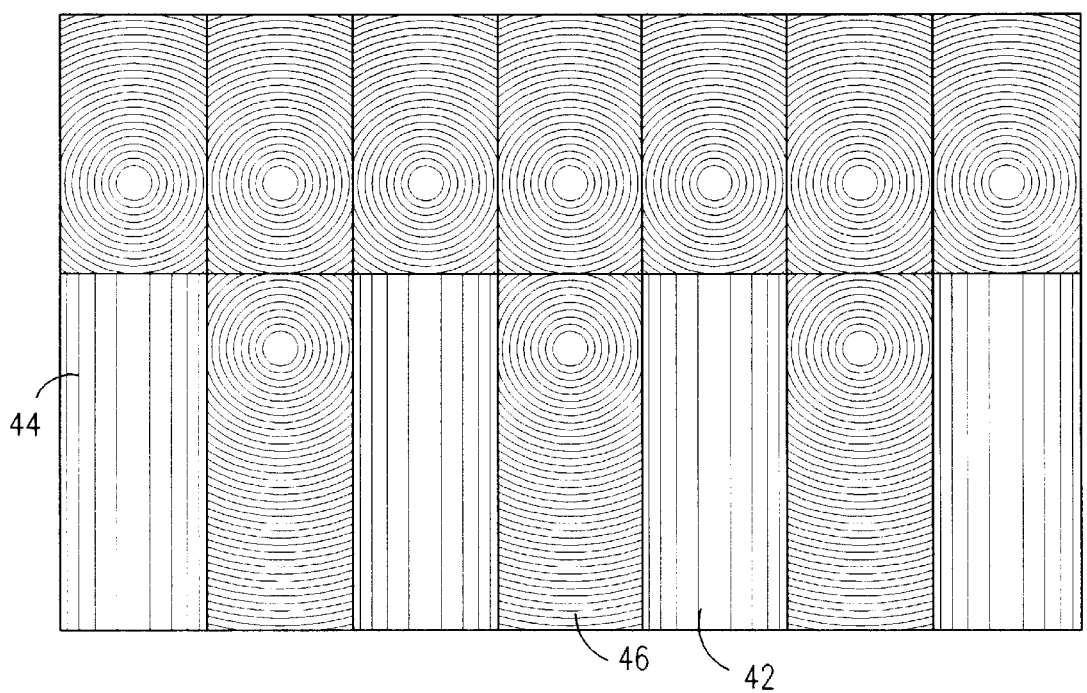
FIG. 4 shows a further array design wherein the cylindrical lenses in the bottom part of the array are interspersed with convex Fresnel lenses.

FIG. 4 shows a further preferred embodiment of the present invention wherein the cylindrical lenses 42 in the bottom row 44 of the array are interspersed with convex Fresnel lenses 46, so that coverage is provided for the mid/near field by a combination of wide area conventional beam focusing, and multiple curtain-like beams resulting from the unidirectional focusing properties of the cylindrical lenses. This provides more thorough protection for the mid/near field, and enables the profile of the protection area to be easily tailored for specific needs. This embodiment is possible since, when using convex Fresnel lenses for focusing the mid/near field, the lens spacing can be made larger than for focusing the far field, thereby leaving spaces into which the cylindrical lenses can be inserted.

Figure 5A:
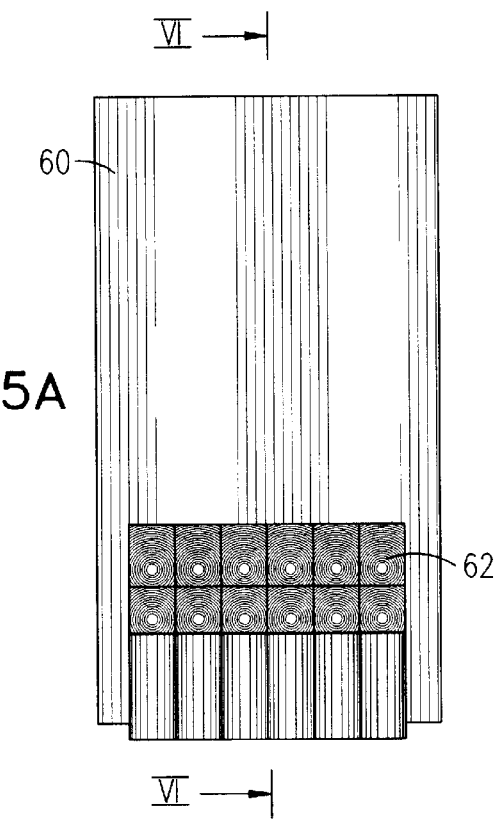
FIGS. 5A to 5C are schematic views of the construction of a passive infra-red intrusion sensor according to a preferred implementation of the present invention, showing the lens array location.
Figure 5B:
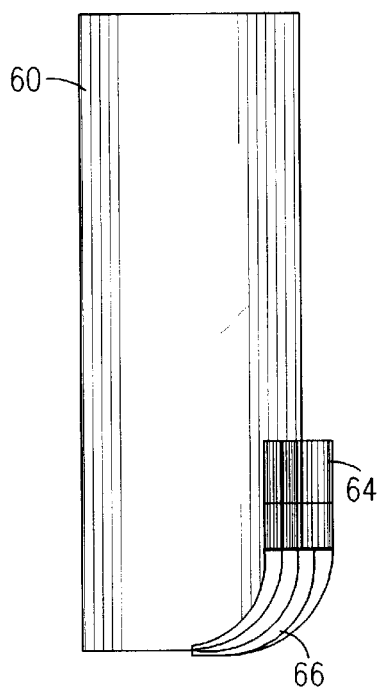
Figure 5C:
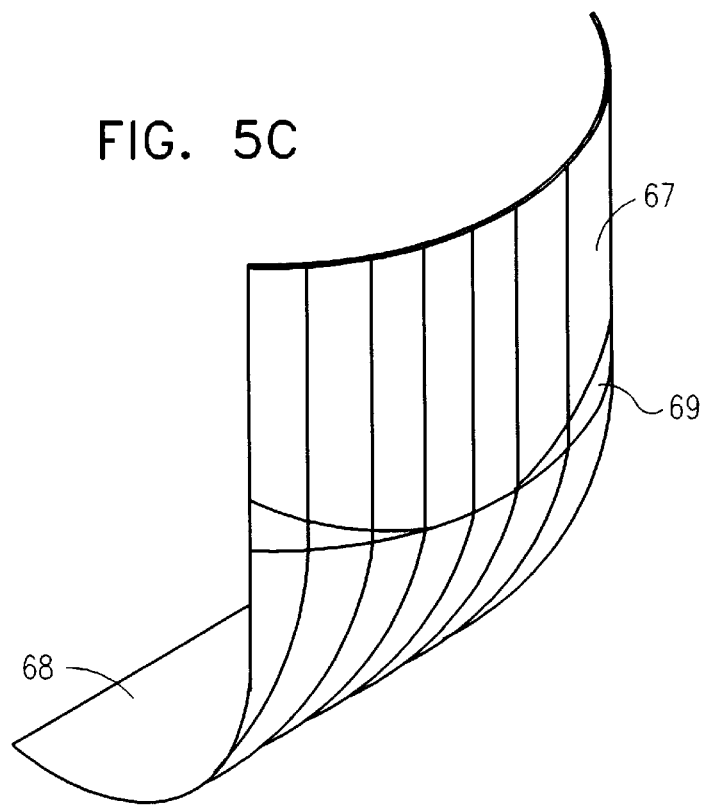

Reference is now made to FIGS. 5A to 5C which show various views of a passive infra-red intrusion sensor constructed and operative according to a preferred embodiment of the present invention.

FIG. 5A is a front view of the sensor 60, and shows a lens array 62 comprising two upper rows of convex Fresnel lenses and one lower row of cylindrical lenses. The side view shown in FIG. 5B illustrates how the whole lens array is curved outwards 64, in order to provide broad azimuthal coverage of the area to be protected. Coverage of over 80 degrees is thereby attained.

The row of cylindrical lenses at the bottom of the array is curved downwards 66 as well as outwards, in order to provide good coverage of the areas in the near field in front of the sensor. By this means, the previously mentioned problems of off-axis focusing is largely eliminated, and the lens array effectively focuses the radiation from an intruder moving very close to the sensor. Furthermore, the increased field of view allows better discrimination to be made between the large signal detected from a full height human and the much smaller signal detected from a pet, which fills only a small part of the field of view.

FIG. 5C shows a complete lens array used in the sensor shown in FIGS. 5A and 5B, bent to a shape which provides azimuthal curvature to the top convex Fresnel lens array 67, and azimuthal and downward curvature to the bottom cylindrical lens array 68. Such a shape can be formed either by molding of the completed three dimensional part, or more cheaply, can be cut from a molded flat sheet of plastic, and curved, folded and stuck to shape. In the latter case, a slot 69 remains on either side which has to be filled by a transparent piece of plastic. Such a shape provides better coverage than the single outward curved lens array used in many of the previously used lens array designs, such as that described in FIG. 4A of the previously mentioned U.S. Pat. No. 4,604,524.

Figure 6:
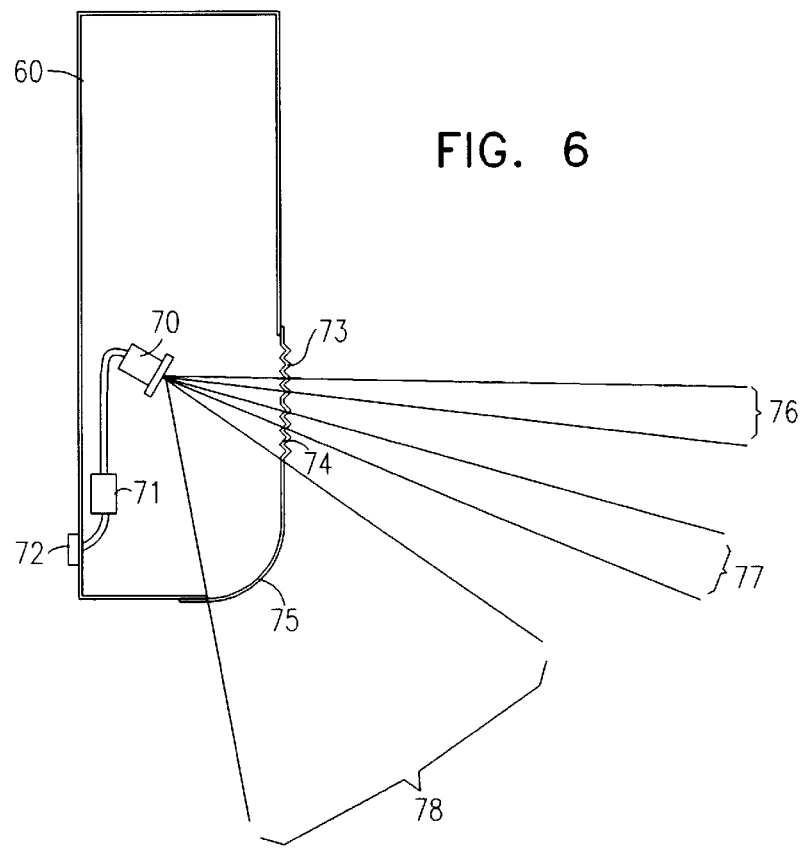
FIG. 6 shows a schematic view of the internal structure of the passive infra-red intrusion sensor depicted in FIGS. 5A and 5B, showing how the various rows of lenses of the multi-faceted lens array are operative in focusing onto the infra-red detector different parts of the field of view of the area to be protected.

FIG. 6 shows a vertical cross section at the plane marked VI in FIG. 5A, down the center of the passive infra-red intrusion sensor 60, showing the internal structure. An infra-red detector 70, preferably a pyroelectric detector, is mounted within the housing in a suitable position such that the lens array is operative to focus onto the detector, infra-red radiation emanating from the areas to be protected by the sensor. The signal from the detector is amplified and processed in a conventional way by means of an electronic unit 71. Various possible methods of constructing such a unit are well known to those skilled in the art, and will therefore not be further described herein. The processed signals are fed to the external control unit by means of an electrical lead 72.

The various rows of lenses of the multi-faceted lens array are operative in focusing different parts of the field of view onto the infra-red detector 70. The complete lens array is positioned relative to the infra-red detector with the top row of convex lenses 73 located approximately at the same height as the detector, so that the far field radiation is imaged by the top row in an approximately horizontal or slightly downward pointing beam envelope 76. Likewise, the array is constructed such that the positions of the second and bottom rows of lenses are correctly aligned relative to the detector, so that they too image onto the detector the correct parts of the area under protection. Thus, the center row 74 of convex lenses images beams 77 from the middle field of the protected area, whilst the bottom row 75, comprising cylindrical lenses, images a series of azimuthally spread curtain beams 78 of the near field.

Figure 7:
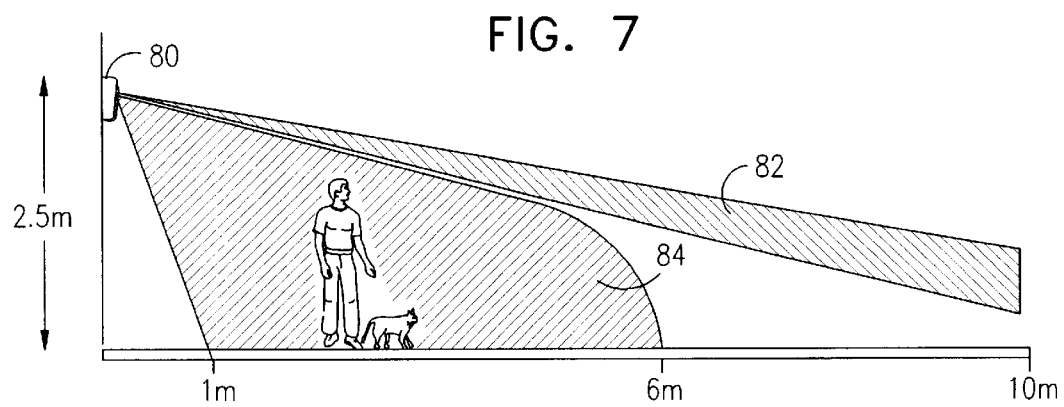
FIG. 7 is a schematic view of the coverage afforded by means of a passive infra-red intrusion sensor fitted with a lens array such as that shown in FIG. 2. The unit provides good medium distance coverage, by means of a convex lens array, sufficient for a medium sized room, as well as near field coverage in the area close to the sensor, by means of an array of downward aimed protective curtain beams provided by the cylindrical section of the lens array.

FIG. 7 is a schematic view of the coverage afforded by means of a passive infra-red intrusion sensor 80 fitted with a lens array such as that shown in FIG. 2. The unit is mounted at a height of about 2.5 m above floor level. The convex Fresnel lenses in the upper row provide good far and medium distance coverage out to a distance of up to 10 m., sufficient for a medium sized room. This is shown schematically by the upper beam 82. The row of cylindrical lenses in the bottom row, provides good coverage in the area immediately in front of the sensor, at distances of from about 1 meter to 6 meters, by means of a fan of downwardly pointing protective curtain beams 84.

Figure 8:
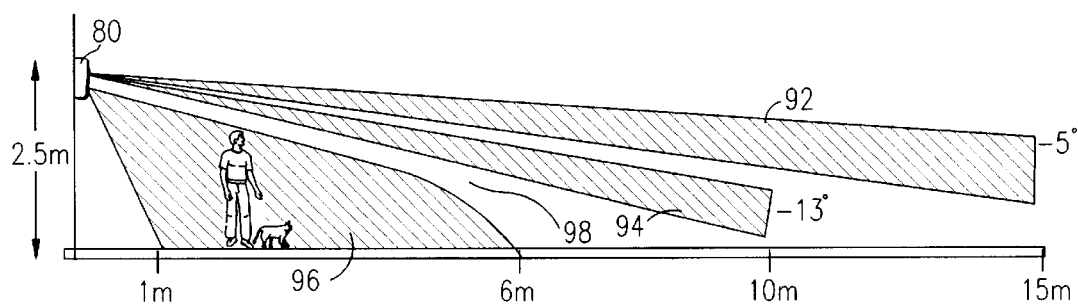
FIG. 8 shows the coverage afforded by the use of a double-row Fresnel convex upper lens array such as that shown in FIG. 3. The extended range of the area covered in the medium/far fields is apparent in the drawing.

FIG. 8 shows the coverage afforded by the use of a double convex Fresnel upper lens array such as that shown in FIG. 3. Since the area to be covered by the convex lenses is split up into middle and far field sections, the area which one sensor unit can cover is extended, and protection can thus be provided out to a distance of about 15 m, sufficient for a large room. This is shown schematically by means of the two beams 92, 94, shown in the drawing. The top far field row of convex lenses covers an effective distance out to 15 m, as represented by the beam 92, whilst the second row of convex lenses covers objects within the area represented by the beam 94, out to about 10 meters. As in the previous case, the bottom row of cylindrical lenses provides good close coverage in the area immediately in front of the sensor, by means of a fan of downwardly pointing protective curtain beams 96. There is, however, a poorly covered area 98 between the bottom edge of the area covered by the mid-range convex Fresnel lens beams 94, and the top of the curtain beams 96 produced by the bottom row of cylindrical lenses in the array.

Figure 9A:
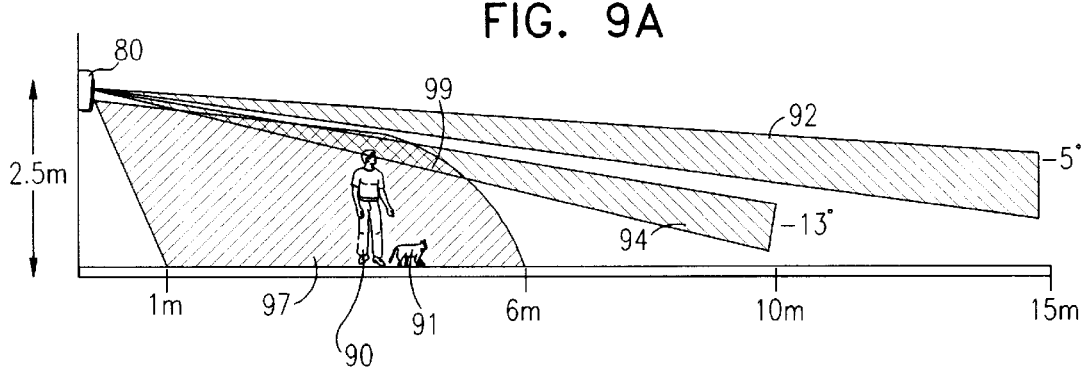

FIG. 9A is a view of the coverage obtained when an array such as that shown in FIG. 4 is used, with a row of convex Fresnel lenses in the upper section, and interspersed convex Fresnel and cylindrical lenses in the bottom section. The convex Fresnel lenses within the two rows act generally as described in FIG. 8, providing cover in the middle and far field of the room, as represented by the beams 92, 94. The effect of the combination of convex Fresnel lenses and cylindrical lenses in the bottom row as shown in FIG. 9A, is to "fill in" the top edge of the near field protective curtain beams, so as to provide an overlap 99 between the near field curtain beams 97 and the middle field beams 94. The dead zone 98 shown in FIG. 8 is thereby virtually eliminated.

Figure 9B:
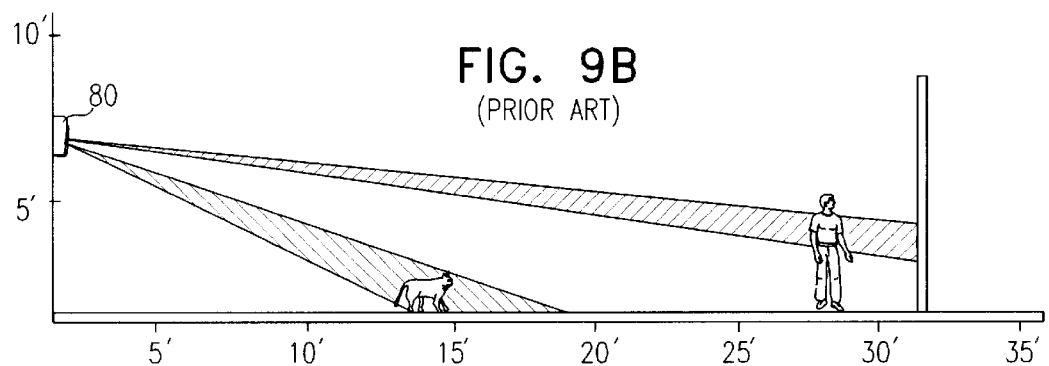
FIG. 9B shows the coverage provided by a prior art sensor such as that described in U.S. Pat. No. 5,670,943. The difference between the two systems in the methods for providing pet avoidance is demonstrated in FIGS. 9A and 9B.

FIG. 9B shows, for comparative purposes with FIG. 9A, the coverage afforded by a prior art invention using conventional lenses in the lower rows. FIG. 9B is derived from, for instance, FIG. 3 of U.S. Pat. No. 5,670,943, mentioned in the background. The comparison between FIGS. 9A and 9B will also assist in clarifying the advantages of the pet immunity method obtained by the present invention, in comparison with the known prior art.

The cylindrical lenses used to produce the effect shown in FIG. 9A have an effectively infinite f-number in the vertical direction, since they have no focusing power in this direction. Consequently, they are able to image objects to any height desired without detracting from their azimuthal focusing power. The height of the curtain beam covered by such a cylindrical lens can be selected by geometric means such that a human 90 moving in the center of the near field just fills the field of view of the lens. In this situation, the near field or lower zone has maximum sensitivity for detection of human intruders, as required from such a system. A pet 91, on the other hand, only fills the field of view partially, and so produces a much smaller detector signal than that of a human in the same area. Thus, the very use of a cylindrical lens for the near field has effective inherent pet discrimination.

In contrast to the DiPoala prior art, pet discrimination is thus obtained not from a small measured difference in emission temperature differences, but by a large difference in filling factor of the image field of view. The human intruder gives a large signal, as he generally fills the field of view of the lens, while the pet gives a small signal commensurate with its size. Even if the human does not fill the complete field of view, the ratio of size between the human and the pet still results in a similar ratio in the size of signals from the detector. The difference in emission temperature between humans and pets is only a smaller second order effect.

FIGS. 10A to 10D show typical electronic signals produced by the pyroelectric infra-red detector used in such intrusion sensors, and illustrate this difference. FIG. 10A shows prior art results, as shown in the DiPoala invention, whilst FIGS. 10B to 10D are curves obtained from a sensor according to the present invention.

Curve 100 of FIG. 10A shows the signal obtained from a human moving in the middle of the lower zone of the area shown in FIG. 9B, protected by a prior art intrusion sensor as described by DiPoala, wherein only part of his body fills the field of view of the lens. Curve 101 of FIG. 10A shows the signal obtained from a medium height pet moving in the same area, but which fills the lens field of view. Lines 108 and 109 represent the upper and lower threshold voltages $V_h$ and $V_l$ used in the sensor electronic circuitry to distinguish between a pet and a human intruder. Curves 100 and 101 are taken from FIG. 4 and FIG. 6 of U.S. Pat. No. 5,670,943, and as stated above, show a signal ratio of 2.3 resulting from the typical differences quoted in that patent between the body emission temperatures of the human and the pet. If the difference in body emission temperatures is smaller, the signal discrimination is even worse.

Curve 102 of FIG. 10B shows the signal obtained as a result of a human moving in the middle of the near field of the area shown in FIG. 9A, protected by an intrusion sensor according to a preferred embodiment of the present invention. The human approximately fills the whole field of view of the cylindrical lens. Curve 103 shows the signal obtained from the same medium height pet as in FIG. 10A, moving in the same area and without taking into consideration any differences in body emission temperature. As is observed, the human signal is three times as large as that of the pet.

If the same 2.3 factor for the difference in body emission temperatures, as used in the prior art FIG. 10A, is applied to the signals shown in FIG. 10B, the results would be as shown in curves 104 and 105 of FIG. 10C. The human signal is seen to be about seven times larger than the pet signal.

The pet immunity inherent in the use of cylindrical lenses in the present invention can be enhanced even more by a further embodiment. In this further preferred embodiment, sensor sensitivity for near field detection is reduced as a varying function of the height above the floor of the protected area. This can be accomplished by applying spatially selective attenuation to the radiation being imaged by the cylindrical lenses, such as by masking them, thus reducing their transmission factor as a function of the angle of reception of the imaged radiation. Maximum attenuation can be provided right at floor level at any predefined point in the area to be protected, tapering off with increased angle above the floor at a rate which can be selected according to the requirements of the area to be protected. Alternatively, since the heights of the pets roaming the area are known, maximum attenuation can be provided at a preselected height above floor level at a predefined distance from the sensor, such that the pets are almost always in the more attenuated section of the lower field of view. This technique is in contrast to that shown in the DiPoala invention and the Visonic MR-3000 and Fox sensors mentioned above, wherein the optics are made such that the whole of the lower zone is rendered less sensitive, as a result of which, real human intrusions in the lower zones could be missed.

It is important to note that these additional embodiments using spatially selective attenuation are only feasible because of the use of cylindrical lenses in the present invention. The convex lenses used in prior art cannot provide such an effect. Masking a convex lens cannot alter the boundaries of its field of view. If part of a convex lens is masked, then the unmasked part of that lens continues to show optical behavior exactly like the complete lens, in that the field of view boundaries are not changed. The only effect is that the overall transmitted intensity of the whole of the field of view of the lens segment is decreased accordingly. On the other hand, since a cylindrical lens has zero optical focusing power in the direction of its axis of symmetry, masking applied along this axis results in a tapered attenuation profile of the lens, which exactly follows the mask taper applied along that axis.

This spatially selective attenuation embodiment multiplies the pet discrimination provided by the field of view and emission temperature effects described above, by a factor equal to the attenuation factor for the height at which the pet is detected. Thus, in the example shown in FIGS. 10C, if an additional attenuation factor of 3 is present at the pet height, then the pet signal becomes 21 times smaller than that of the human. The signals from human intruder and pet under these conditions are shown in curves 106 and 107 respectively of FIG. 10D.

It is therefore evident that an intrusion sensor system constructed and operative in accordance with this embodiment of the present invention provides very significantly improved pet immunity, in comparison with that obtained from previously available systems.

Figure 11:
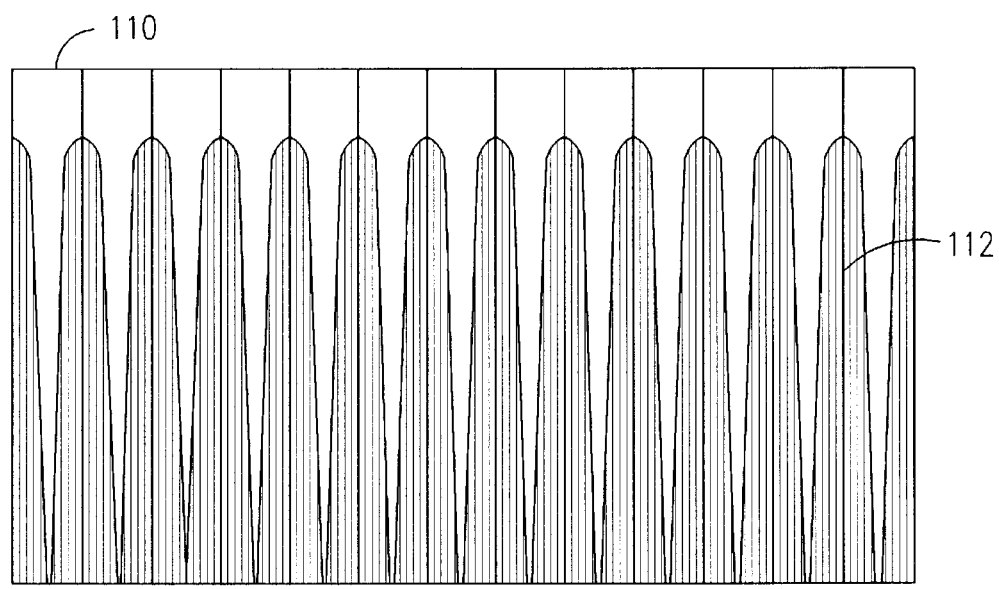
Figure 12:
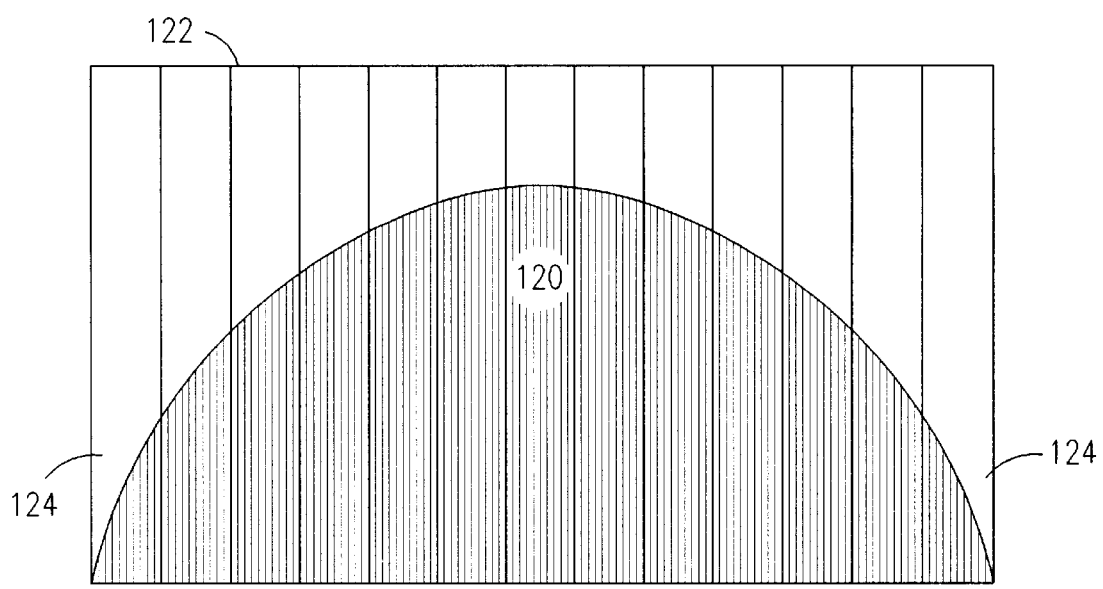

There are a number of methods of applying such spatially selective attenuation to the radiation being imaged by the cylindrical lenses. FIG. 11 to FIG. 18 show several different methods FIG. 11 to FIG. 13 show preferred embodiments whereby the spatially selective attenuation is produced by masking parts of the row of cylindrical lenses. FIG. 11 shows a row of cylindrical lens segments 110, as used in the bottom row of a lens array constructed and operative in accordance with a preferred embodiment of the present invention. Each individual cylindrical lens segment is masked 112 in such a way that the transmission coefficient of each lens segment is reduced to a minimum at the bottom edge of the row.

The row of cylindrical lenses 122 shown in FIG. 12 achieves pet avoidance by means of masking 120 applied to the whole row, such that the overall transmission of the array is cut off towards its bottom edge. However, unlike the embodiment shown in FIG. 11, the profile of the mask is selected such that the attenuation is only fully applied at the center of the array, tapering off to the sides 124, such that full sensor height sensitivity is achieved at the edges. Such a profile is useful for situations in which the sensor is to be installed in the corner of a room, surveilling the room diagonally. The pet avoidance effect is fully operational for the center of the room, but tapers off to be fully non-operational along the side walls of the room, where full height sensitivity is required to detect intruders entering through openings in the side walls.

FIG. 13 shows another preferred embodiment for introducing spatially selective attenuation into the row of cylindrical lenses 122, wherein there is a uniform transmission cut-off at a specific angle, such as mentioned above for immunity from pets of known height. This height can be selected during installation by the application of straight masking 126 on the row at a specific height.

Besides the masking methods shown in FIG. 11 to FIG. 13, further embodiments of pet avoidance can be obtained by changing the optical transmission in the path of the beam focused by the cylindrical lens rows. FIGS. 14A and 14B show two such preferred embodiment, in which the cylindrical lenses 130 are made of a material with slightly infra-red attenuating properties, and have an optical thickness with a tapered profile, such that their infra-red imaging sensitivity varies as a function of the angle from the array to points on the floor of the area being imaged by the lens. The taper can be either wedge-shaped with straight sides 132, as in FIG. 14A, or with curved sides 133, as in FIG. 14B. As an alternative, as illustrated in FIG. 15A, a tapered section of infra-red attenuating material 134 can be positioned behind the cylindrical lens array 130, to provide the required spatially selective attenuation profile. FIG. 15B shows a similar tapered section positioned in front of the cylindrical lens array.

Figure 16A:
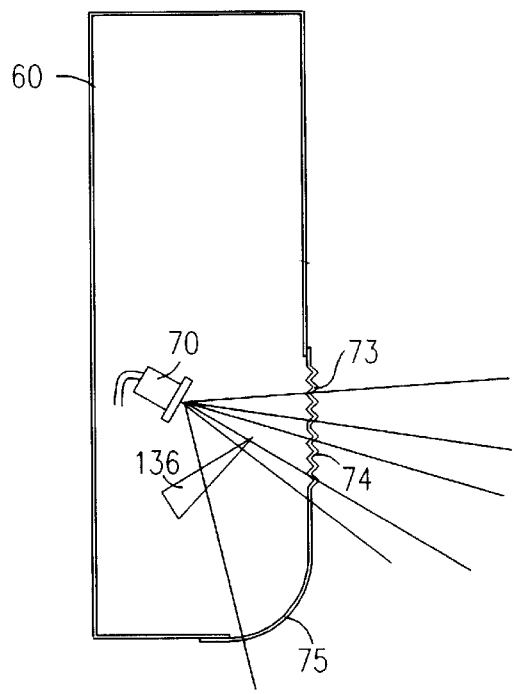
FIG. 16A shows a tapered section of infra-red absorbing material inserted into the beam path between the cylindrical lens and the infra-red detector.
Figure 16B:
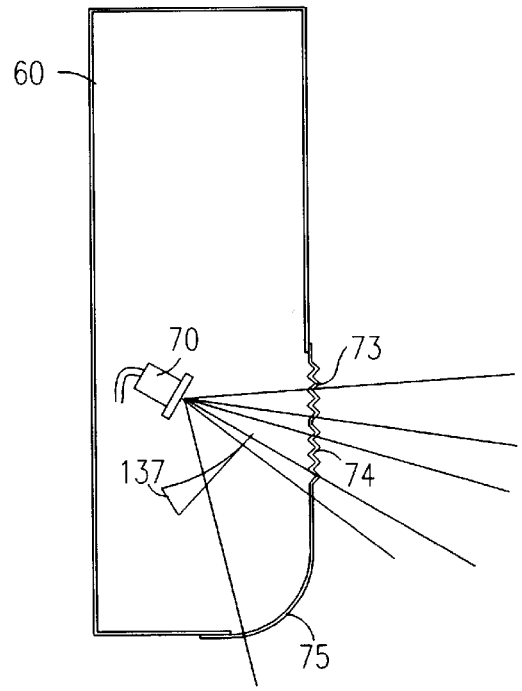
FIG. 16B and FIG. 16C respectively show a curved section and a sheet fulfilling the same function.
Figure 16C:
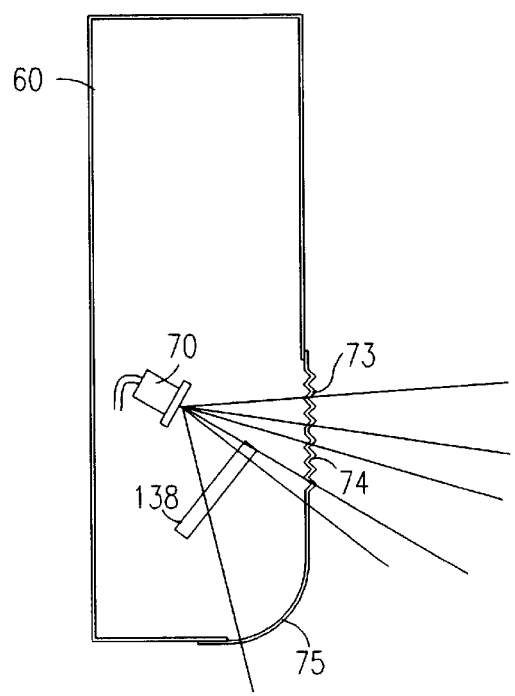

FIG. 16A illustrates a further preferred embodiment, obtained by positioning a tapered section of attenuating material in the correct predefined position in the optical path between the lens array 75 and the infra-red detector 70. The taper can be either wedge-shaped with straight sides 136, as in FIG. 16A, or with curved sides 137, as in FIG. 16B. In place of a tapered section, a flat or curved sheet of attenuating material 138 may be used, as shown in FIG. 16C, the sheet being aligned at an angle to the optical axis of the radiation being imaged, such that the optical path length through the sheet varies with the angle at which the radiation passes through the sheet. This effectively simulates a tapered section. In any of the previous three embodiments, the tapered section of attenuating material may also be shorter than the cylindrical lens or the width of the imaged beam of radiation, and positioned such that the beam attenuation only starts at an angle equivalent to the maximum height of the pet at the required distance.

The attenuating material used in these last two embodiments can preferably be an infra red attenuating plastic, or a pigment-loaded infra red clear plastic such as high density polyethylene.

Figure 17A:
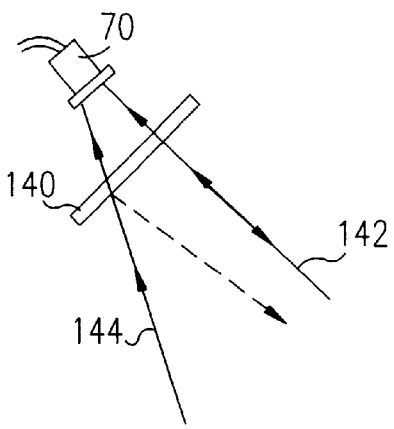
FIG. 17A shows a sheet of transmissive plastic inserted into the beam path between the cylindrical lens and the infra-red detector in such a way as to cause spatially varying reflection of the beam from its surface.
Figure 17B:
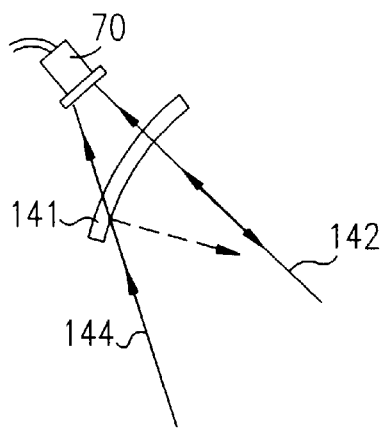
FIG. 17B shows a curved sheet fulfilling the same function.

The above mentioned embodiments for pet avoidance utilize spatially selective attenuation of the beam by means of materials inserted into the optical path of the beam. The same effects can be achieved by means of controlled reflection of the radiation from a surface in its optical path. FIG. 17A shows how this can be achieved in one preferred embodiment by positioning a piece of high density polyethylene sheet 140 between the lens and the detector 70, at an angle to the optical axis of the radiation being imaged, in such a way as to selectively reflect part of the beam so that it does not reach the detector. Since the percentage of radiation reflected is a function of the angle of incidence, the piece of plastic sheet changes the effective detection sensitivity as a function of spatial position, thus providing the spatially selective attenuation required for pet avoidance. Radiation 142 coming from the top section of the cylindrical lens strikes the plastic sheet at approximately normal incidence, such that little is reflected, while radiation 144 coming from the bottom part of the cylindrical lens hits the plastic sheet at a high angle of incidence, and thus is strongly reflected. The sheet as defined in this embodiment may be flat 140, as shown in FIG. 17A, or curved 141, as shown in FIG. 17B, so long as it is aligned at the correct position and angle.

Figure 18:
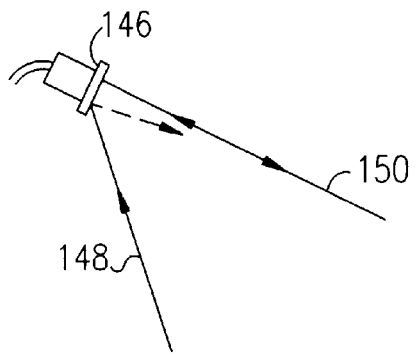

FIG. 18 illustrates another preferred method of doing this by tilting the detector 70 itself, to such an angle that the front window 146 reflects the bottom part of the beam 148, which is to be attenuated, more than the upper part 150, thereby producing an intensity gradient to the beam entering the detector.

According to the present invention, the shape of the attenuation profile can be tailored such that the signal received because of a pet of a certain size at the closest point in the room, is attenuated such that it is exactly the same as the signal received because of that same pet at the furthest point of the room. The pet immunity system available from the present invention can thus provide the same discrimination sensitivity level wherever the pet is within the protected area.

Another advantage of a graded attenuation profile for pet avoidance results from the fact that the main infra-red emission from a human comes from the upper part of his body, such as the face and hands. Therefore, the strong reduction in sensitivity close to floor level attained by the various embodiments of this invention do not affect the probability of detection of a human intruder, since the lower parts of his body are not the main source of his infra-red radiation.

The above mentioned preferred embodiments of this invention therefore provide effective and versatile solutions to the problem of false alarms caused by pets, while still maintaining good intrusion sensing capability in the near field, and their implementation allows intrusion systems to be left operative even while pets are moving around the protected area.

It is theoretically feasible to apply spatially selective attenuation also to the near field slots described in the Messiou and Owers patents, to provide pet immunity. In practice, this is not done, since the sensitivity of the slot technology is already so low that the detection of pets by the slot sections of the lens array is unlikely.

Figure 19:
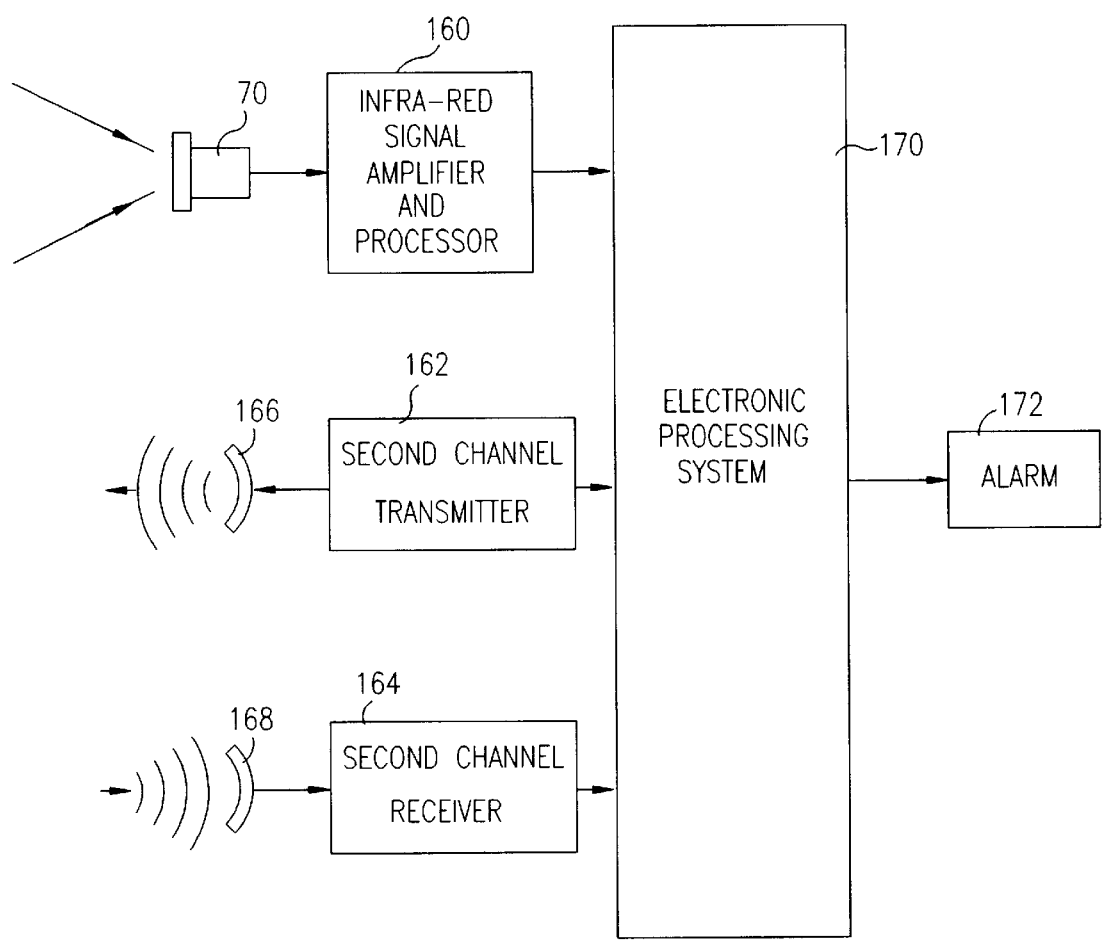
FIG. 19 is a block diagram showing the circuit elements of a dual channel intrusion sensor system, comprising a passive infra-red sensor as the main channel, and an additional intrusion sensor acting in parallel. The second sensor is either an active microwave sensor, or an active ultrasonic sensor, or another passive infra red sensor, or any other suitable sensor.

A further embodiment of an intruder sensing system according to the present invention incorporates a passive infra-red intrusion sensor system, constructed and operative according to the present invention, together with an additional intrusion sensor, surveilling the same area as the passive infra-red intrusion sensor. An intrusion warning is only issued when both channels receive warning signals, thus reducing the incidence of false alarms. FIG. 19 is a block diagram representation of such a dual system, and shows the passive infra-red detector 70, with its associated electronic signal amplifier and processor 160, and the second channel transmitter 162 and receiver units 164, with their respective antennae 166, 168. The electronic signals from both channels are inputted to a further electronic processing system which only causes an intruder warning to be issued from the alarm 172 if both channels are activated. The second channel can preferably be an active microwave detection system which senses the Doppler signal reflected from a moving intruder, or an active ultrasonic detection system, which too senses the reflected signal from an intruder, or even a second passive infra red sensor system, in which case the transmitter unit 162 and its associated antenna 166 are not used, or any other suitable sensor. The technology by which such a dual channel system is implemented is well known to those skilled in the art, and further detailed explanations are not therefore given herewithin.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

What is claimed is:

1. An infra-red lens array comprising a plurality of lenses arranged in at least one upper row comprising at least one convex lens, and at least one lower row comprising at least one cylindrical lens whose cylindrical axis is aligned substantially perpendicular to the direction of the row.

2. An infra-red lens array according to claim 1, and wherein at least one of said plurality of lenses is a Fresnel lens.

3. An infra-red lens array according to claim 1, and wherein said at least one lower row comprising at least one cylindrical lens also comprises at least one convex lens.

4. An infra-red lens array comprising at least one row including at least one cylindrical lens operative to provide spatially varying partial attenuation to radiation imaged by said lens.

5. An infra-red lens array according to claim 4, and wherein said spatially varying partial attenuation is produced by means of masking.

6. A passive infra-red intrusion sensor comprising:
a housing;
an infra-red detector; and
an infra-red lens array according to claim 1.

7. A passive infra-red intrusion sensor according to claim 6, and wherein at least one of said plurality of lenses is a Fresnel lens.

8. A passive infra-red intrusion sensor according to claim 6, and wherein said at least one upper row comprises two upper rows.

9. A passive infra-red intrusion sensor according to claim 6, and wherein said at least one lower row comprising at least one cylindrical lens also comprises at least one convex lens.

10. A passive infra-red intrusion sensor according to claim 6, and wherein said at least one upper row comprising at least one convex lens has azimuthal outward curvature.

11. A passive infra-red intrusion sensor according to claim 6, and wherein said at least one lower row comprising at least one cylindrical lens has azimuthal outward and downward curvature.

12. A passive infra-red intrusion sensor according to claim 6, and wherein said at least one upper row comprising at least one convex lens is operative to image a more distant section of an area under surveillance than the section imaged by said at least one lower row comprising at least one cylindrical lens.

13. A passive infra-red intrusion sensor according to claim 6, and wherein said at least one lower row comprising at least one cylindrical lens is operative to image at least one vertically shaped sector of an area imaged by said lens.

14. A passive infra-red intrusion sensor according to claim 6, and wherein said at least one cylindrical lens has a vertical field of view that it is essentially just filled by an average sized adult in a standing disposition, located near the center of the area imaged by said lens.

15. A passive infra-red intrusion sensor comprising:
a housing;
an infra-red detector; and
an infra-red lens array according to claim 4.

16. A passive infra-red intrusion sensor according to claim 15, and comprising at least one upper row comprising at least one convex lens.

17. A passive infra-red intrusion sensor according to claim 15, and wherein said spatially selective attenuation is produced by means of masking.

18. A passive infra-red intrusion sensor according to claim 17, and wherein said masking is applied to individual cylindrical lenses in said at least one row.

19. A passive infra-red intrusion sensor according to claim 15, and wherein said spatially selective attenuation is operative to cause variation of the imaging sensitivity of said at least one cylindrical lens as a function of the angle from said array towards points on the floor of the area being imaged by said at least one cylindrical lens.

20. A passive infra-red intrusion sensor according to claim 19, and wherein said variation of the imaging sensitivity of said at least one cylindrical lens as a function of the angle from said array towards points on the floor of the area imaged by said at least one cylindrical lens, varies as a function of the azimuthal field of view of said array.

21. A passive infra-red intrusion sensor according to claim 15, and wherein said spatially selective attenuation is operative to reduce the probability of detection of objects such as pets located below a predefined angle from the horizontal.

22. A passive infra-red intrusion sensor comprising:
a housing;
an infra-red detector;
a lens array comprising at least one row including at least one cylindrical lens for imaging infra-red radiation onto said detector; and optical apparatus causing spatially varying partial attenuation to radiation imaged by said at least one cylindrical lens.

23. A passive infra-red intrusion sensor according to claim 22, and comprising at least one upper row comprising at least one convex lens.

24. A passive infra-red intrusion sensor according to claim 22, and wherein said spatially selective attenuation is produced by means of masking.

25. A passive infra-red intrusion sensor according to claim 24, and wherein said masking is applied to individual cylindrical lenses in said at least one row.

26. A passive infra-red intrusion sensor according to claim 22, and wherein said spatially selective attenuation is produced by means of an infra-red attenuator disposed in the optical path of said radiation.

27. A passive infra-red intrusion sensor according to claim 22, and wherein said spatially selective attenuation is produced by means of partial reflection of said radiation from a surface in the optical path of said radiation.

28. A passive infra-red intrusion sensor according to claim 22, and wherein said at least one cylindrical lens is made of infra-red attenuating material and has an optical thickness of tapered profile, thereby producing said spatially selective attenuation.

29. A passive infra-red intrusion sensor according to claim 22, and wherein said spatially selective attenuation is provided by means of a tapered section of infra-red attenuating material, disposed in juxtaposition to said at least one cylindrical lens.

30. A passive infra-red intrusion sensor according to claim 26, and wherein said infra-red attenuator is a tapered section of attenuating material interposed between said at least one cylindrical lens and said infra-red detector.

31. A passive infra-red intrusion sensor according to claim 26, and wherein said infra-red attenuator is a sheet of attenuating material interposed between said at least one cylindrical lens and said infra-red detector.

32. A passive infra-red intrusion sensor according to claim 27 and wherein said partial reflection of said radiation takes place from the surface of a sheet of infra-red transmitting material interposed between said at least one cylindrical lens and said infra-red detector.

33. A passive infra-red intrusion sensor according to claim 27 and wherein said partial reflection of said radiation takes place from the surface of said infra-red detector.

34. A passive infra-red intrusion sensor according to claim 22, and wherein said spatially selective attenuation is operative to cause variation of the imaging sensitivity of said at least one cylindrical lens as a function of the angle from said sensor towards points on the floor of the area being imaged by said at least one cylindrical lens.

35. A passive infra-red intrusion sensor according to claim 34, and wherein said variation of the imaging sensitivity of said at least one cylindrical lens as a function of the angle from said sensor towards points on the floor of the area being imaged by said at least one cylindrical lens, varies as a function of the azimuthal field of view of said array.

36. A passive infra-red intrusion sensor according to claim 22, and wherein said spatially selective attenuation is operative to reduce the probability of detection of objects such as pets located below a predefined angle from the horizontal.

37. A passive infra-red intrusion sensor comprising optical apparatus including a cylindrical lens arranged generally vertically causing spatially varying partial attenuation to radiation being imaged, said spatially varying attenuation being operative to reduce detection sensitivity close to floor level where a human emits lower levels of radiation, and to maintain detection sensitivity at human head and hand level, where a human emits higher level of radiation, thereby providing a lower probability of detecting a pet and a higher probability of detecting a human.

38. An intrusion sensor system comprising a passive infra-red intrusion sensor according to claim 6, and at least one additional intrusion sensor surveilling substantially the same area as said passive infra-red intrusion sensor.

39. An intrusion sensor system according to claim 38, and wherein said at least one additional intrusion sensor is an active microwave sensor.

40. An intrusion sensor system according to claim 38, and wherein said at least one additional intrusion sensor is an active ultrasonic sensor.

41. An intrusion sensor system according to claim 38, and wherein said at least one additional intrusion sensor is a passive infra-red intrusion sensor.

42. An intrusion sensor system comprising a passive infra-red intrusion sensor according to claim 22, and at least one additional intrusion sensor surveilling substantially the same area as said passive infra-red intrusion sensor.

43. An intrusion sensor system according to claim 42, and wherein said at least one additional intrusion sensor is an active microwave sensor.

44. An intrusion sensor system according to claim 42, and wherein said at least one additional intrusion sensor is an active ultrasonic sensor.

45. An intrusion sensor system according to claim 42, and wherein said at least one additional intrusion sensor is a passive infra-red intrusion sensor.

* * * * *